(12) United States Patent
Kato et al.

(10) Patent No.: US 9,450,699 B2
(45) Date of Patent: Sep. 20, 2016

(54) OPTICAL DROP DEVICE, OPTICAL DROP METHOD, AND OPTICAL ADD DEVICE

(71) Applicant: FUJITSU LIMITED, Kawasaki-shi, Kanagawa (JP)

(72) Inventors: Tomoyuki Kato, Yokohama (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/538,175

(22) Filed: Nov. 11, 2014

(65) Prior Publication Data

US 2015/0139644 A1 May 21, 2015

(30) Foreign Application Priority Data

Nov. 21, 2013 (JP) ................. 2013-240567

(51) Int. Cl.
*H04Q 11/00* (2006.01)
*H04J 14/08* (2006.01)
*H04J 14/02* (2006.01)

(52) U.S. Cl.
CPC ............ *H04J 14/083* (2013.01); *H04J 14/021* (2013.01); *H04J 14/0223* (2013.01); *H04Q 11/0003* (2013.01)

(58) Field of Classification Search
None
See application file for complete search history.

(56) References Cited

U.S. PATENT DOCUMENTS

2012/0318965 A1* 12/2012 Tosaki ............... H04B 10/0773
250/227.11

FOREIGN PATENT DOCUMENTS

| EP | 1185007 A2 | 3/2002 |
|---|---|---|
| JP | 2012-119925 | 6/2012 |
| WO | 95/10870 | 4/1995 |

OTHER PUBLICATIONS

Palushani et al., "OTDM-to-WDM Conversion Based on Time-to-Frequency Mapping by Time-Domain Optical Fourier Transformation", IEEE Journal of Selected Topics in Quantum Electronics, vol. 18, No. 2, pp. 681-688, Mar./Apr. 2012.
Extended European Search Report mailed Mar. 27, 2015 in related European Application No. 14193427.3.
Toshihiko Hirooka et al., "All-optical 40 GHz Time-domain Fourier Transformation Using XPM with a Dark Parabolic Pulse", Optical Fiber Communication/National Fiber Optic Engineers Conference, Feb. 24, 2008, pp. 1-3.
A.K. Mishra et al., Comb Generator for 100 Gbit/s OFDM and Low-Loss Comb-Line Combiner Using the Optical Inverse Fourier Transform (IFFT), 13th International Conference on Transparent Optical Networks (ICTON), Jun. 26, 2011, pp. 1-5.

* cited by examiner

*Primary Examiner* — Darren E Wolf
(74) *Attorney, Agent, or Firm* — Staas & Halsey LLP

(57) ABSTRACT

An optical drop device includes: a clock extractor configured to extract a clock signal from a multi-channel optical signal that includes a plurality of optical signals having different optical frequencies; a pulse generator configured to generate a pulse signal that is synchronized with the clock signal; an optical inverse Fourier transform unit configured to transform the multi-channel optical signal into a time division multiplexing optical signal by using an inverse Fourier transform; and an optical switch configured to drop an optical signal that exists in a time slot to which the pulse signal is applied, from the time division multiplexing optical signal.

6 Claims, 17 Drawing Sheets

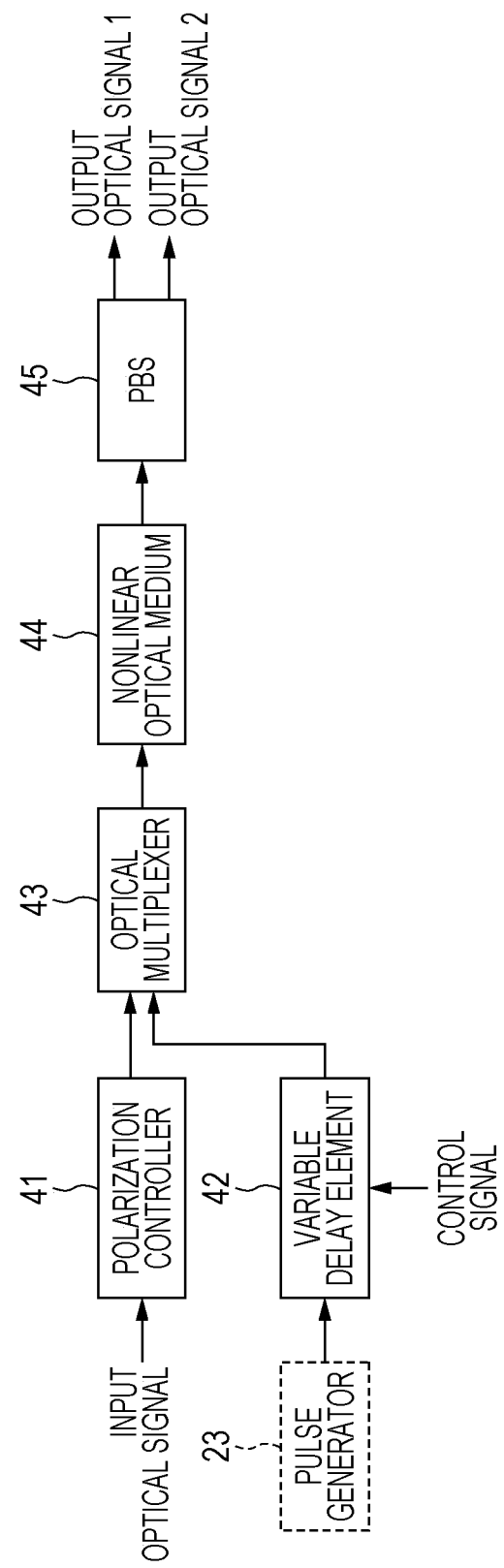

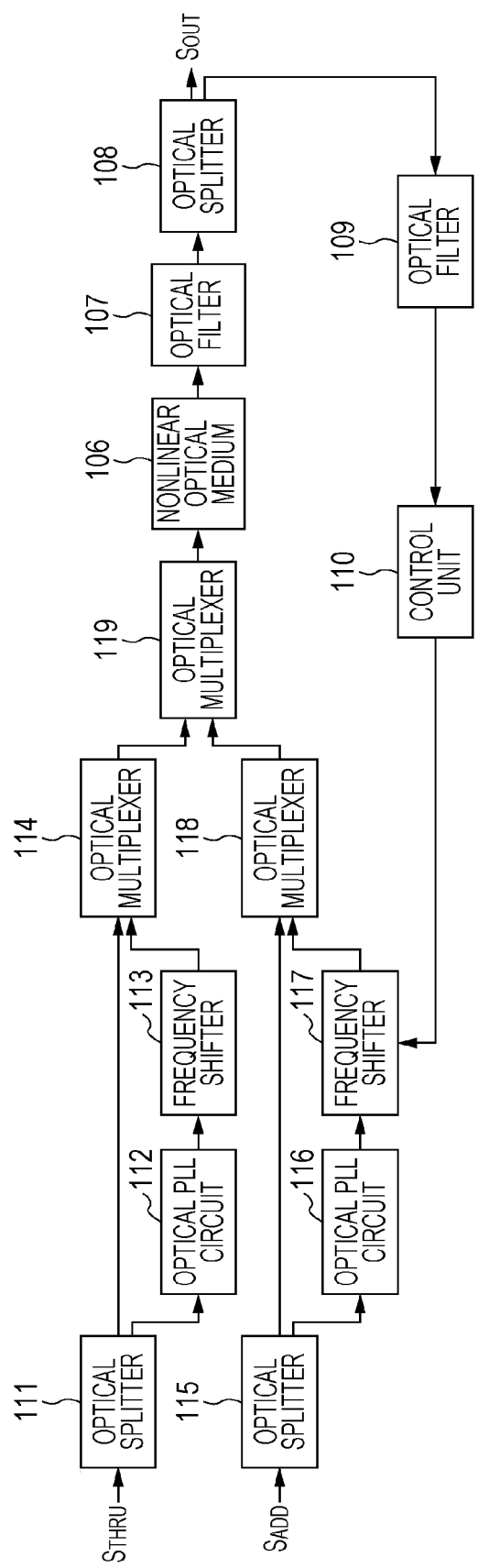

OPTICAL DROP DEVICE, OPTICAL DROP METHOD, AND OPTICAL ADD DEVICE

CROSS-REFERENCE TO RELATED APPLICATION

This application is based upon and claims the benefit of priority of the prior Japanese Patent Application No. 2013-240567, filed on Nov. 21, 2013, the entire contents of which are incorporated herein by reference.

FIELD

The embodiments discussed herein are related to an optical drop device and an optical drop method by which an optical signal is dropped from a multi-channel optical signal, and an optical add device and an optical add method by which an optical signal is added to a multi-channel optical signal.

BACKGROUND

As one of technologies that realize the large capacity of an optical transmission system, wavelength division multiplexing (WDM) has been put into practice. In the WDM, transmission of a multi-channel optical signal (that is, WDM signal) is performed in which a plurality of optical signals having different wavelengths (or optical frequencies) is multiplexed.

In the optical transmission system that performs transmission of a WDM signal, an optical add drop multiplexer (OADM) is provided in each node. The OADM may drop a specified optical signal from the WDM signal. The optical signal that is dropped from the WDM signal is guided, for example, to a client device. In addition, the OADM may add an optical signal that has been received from the client device or a further network, to the WDM signal.

The above-described add/drop function of the OADM is realized, for example, using a wavelength selective switch (WSS). The WSS may select an optical signal having a desired wavelength, for example, using an array waveguide grating, a micromachine, a liquid crystal, or the like.

In Japanese Laid-open Patent Publication No. 2012-119925, a reconfigurable OADM (ROADM) device and an optical add drop method are discussed.

When the wavelength interval of the WDM signal is reduced in the optical transmission system, the transmission capacity is further increased, and the flexibility of the network may be improved. However, in an existing WSS, it is difficult to realize sharp light-transmission characteristics, and there is a limitation of the wavelength intervals of a WDM signal.

SUMMARY

According to an aspect of the invention, an optical drop device includes: a clock extractor configured to extract a clock signal from a multi-channel optical signal that includes a plurality of optical signals having different optical frequencies; a pulse generator configured to generate a pulse signal that is synchronized with the clock signal; an optical inverse Fourier transform unit configured to transform the multi-channel optical signal into a time division multiplexing optical signal by using an inverse Fourier transform; and an optical switch configured to drop an optical signal that exists in a time slot to which the pulse signal is applied, from the time division multiplexing optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a first example of the optical switch;

FIG. 17 is a diagram illustrating a configuration of a fourth example of the optical add device.

DESCRIPTION OF EMBODIMENTS

An OADM processes a WDM signal in which a plurality of optical signals having different wavelengths is multiplexed. That is, the OADM may drop an optical signal having a specified wavelength from the WDM signal. In addition, the OADM may add an optical signal having a certain wavelength to the WDM signal. Hereinafter, a WDM signal may be referred to as a multi-channel optical signal. A plurality of channels may perform transmission of optical signals having different optical frequencies (or different wavelengths). That is, the multi-channel optical signal includes a plurality of optical signals having different optical frequencies.

Figure 1:
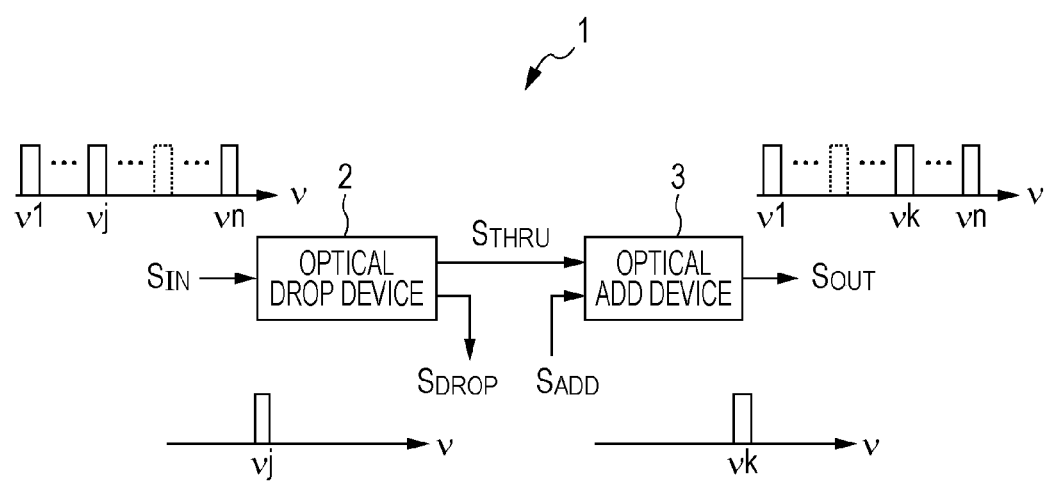
FIG. 1 is a diagram illustrating a configuration of an OADM according to an embodiment.

FIG. 1 is a diagram illustrating a configuration of an OADM 1 according to an embodiment. Here, the OADM 1 is used in an optical transmission system that performs transmission of a multi-channel optical signal S. The multi-channel optical signal S accommodates a plurality of channels ν1 to νn. The channel νi (i=1 to n) may perform transmission of an optical signal having an optical frequency vi. Hereinafter, an optical frequency may be referred to as "frequency".

As illustrated in FIG. 1, the OADM 1 includes an optical drop device 2 and an optical add device 3. The optical drop device 2 may drop an optical signal having a desired frequency from an input multi-channel optical signal $S_{IN}$. In the example illustrated in FIG. 1, the optical drop device 2 drops an optical signal having a frequency vj from the input multi-channel optical signal $S_{IN}$. The optical signal that has been dropped from the multi-channel optical signal $S_{IN}$ is guided, for example, to a client device as a drop optical signal $S_{DROP}$. On the other hand, the multi-channel optical signal $S_{IN}$ from which the optical signal having the frequency vj has been dropped is guided to the optical add device 3 as a multi-channel optical signal $S_{THRU}$. It is assumed that a channel vk of the multi-channel optical signal $S_{THRU}$ is not used.

The multi-channel optical signal $S_{THRU}$ and an optical signal $S_{ADD}$ are input to the optical add device 3. Here, the frequency of the optical signal $S_{ADD}$ is "vk". In addition, the optical signal $S_{ADD}$ is generated, for example, by the client device. In addition, the optical add device 3 adds the optical signal $S_{ADD}$ to the multi-channel optical signal $S_{THRU}$ to generate a multi-channel optical signal $S_{OUT}$. In FIG. 1, a frequency spectrum of the input multi-channel optical signal SIN, the drop optical signal $S_{DROP}$, the optical signal $S_{ADD}$, and the multi-channel optical signal $S_{OUT}$ is illustrated.

<Optical Drop Device>

Figure 2:
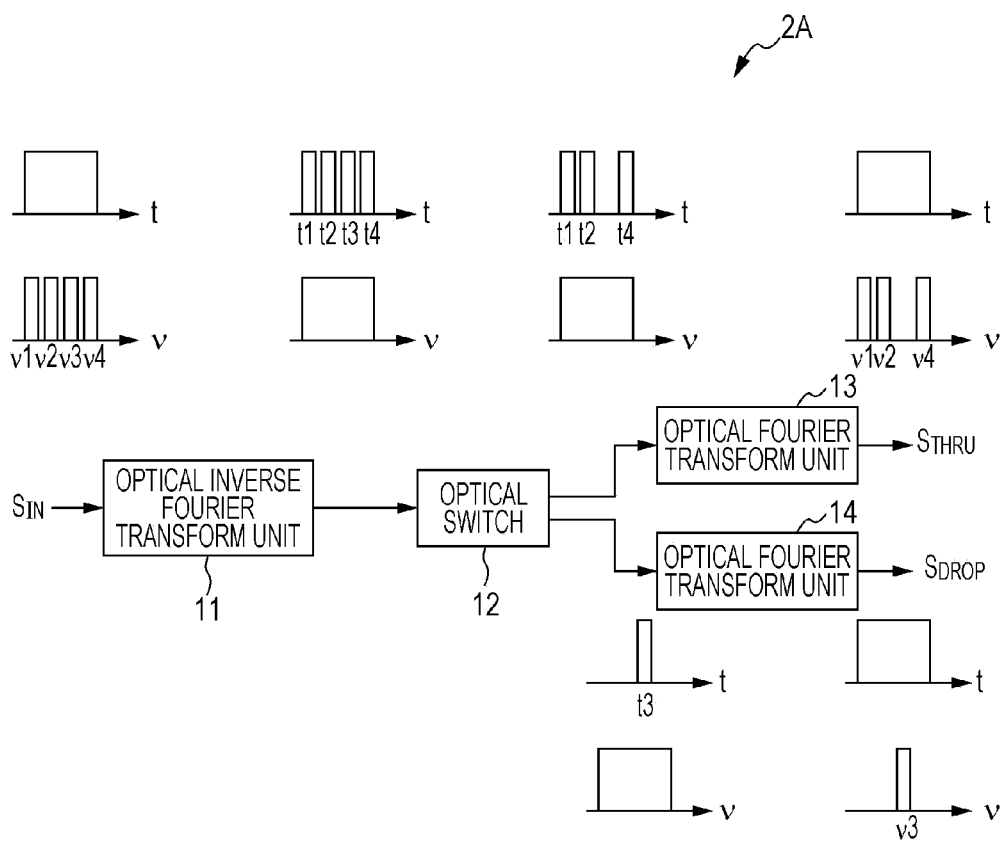
FIG. 2 is a diagram illustrating a configuration of a first example of an optical drop device.

FIG. 2 is a diagram illustrating a configuration of a first example of the optical drop device. As illustrated in FIG. 2, an optical drop device 2A of the first example includes an optical inverse Fourier transform unit 11, an optical switch 12, an optical Fourier transform unit 13, and an optical Fourier transform unit 14. In the example illustrated in FIG. 2, in multi-channel optical signal S, four optical signals (optical signals having frequencies v1 to v4) are multiplexed. Hereinafter, the optical signals having frequencies v1 to v4 may be respectively referred to as optical signals v1 to v4. In addition, frequency channels that are used to perform transmission of the optical signals v1 to v4 may be respectively referred to as the channels v1 to v4.

In addition, FIG. 2 illustrates the frequency spectrum and strength of optical signals that are processed by the optical drop device 2A. The strength of an optical signal indicates a change in the strength or power of the optical signal within one symbol time.

A multi-channel optical signal $S_{IN}$ is input to the optical inverse Fourier transform unit 11. The multi-channel optical signal $S_{IN}$ includes optical signals v1 to v4. The optical signals v1 to v4 are multiplexed in the frequency area. In addition, the optical inverse Fourier transform unit 11 transforms the multi-channel optical signal $S_{IN}$ into a time division multiplexing optical signal. At this time, the optical signals v1 to v4 are respectively transformed into optical signals t1 to t4 by the optical inverse Fourier transform unit 11. That is, the time division multiplexing optical signal that has been generated from the multi-channel optical signal $S_{IN}$ includes the optical signals t1 to t4. The optical signals t1 to t4 are multiplexed in the time area.

In the following description, the time division multiplexing optical signal may be referred to a TDM optical signal. In addition, channels that are used to perform transmission of optical signals that are multiplexed in the TDM optical signal may be referred to as time slots. That is, in the TDM optical signal illustrated in FIG. 2, the optical signals t1 to t4 may be multiplexed using time slots TS1 to TS4.

The optical switch 12 may perform gate processing in the time area. That is, the optical switch 12 may drop a desired optical signal from the optical signals t1 to t4 that are multiplexed in the TDM optical signal. In the example illustrated in FIG. 2, the optical switch 12 drops the optical signal t3 from the TDM optical signal. The optical signal t3 that has been dropped from the TDM optical signal is guided to the optical Fourier transform unit 14. On the other hand, the TDM optical signal from which the optical signal t3 has been dropped (that is, the TDM optical signal that includes the optical signals t1, t2, and t4) is guided to the optical Fourier transform unit 13. In the example illustrated in FIG. 2, one optical signal is dropped from the TDM optical signal, but the optical switch 12 may drop a plurality of optical signals from the TDM optical signal.

The optical Fourier transform unit 13 transforms the TDM optical signal that includes the optical signals t1, t2, and t4 into an optical signal in the frequency area. That is, the optical Fourier transform unit 13 executes transformation processing that corresponds to the optical inverse Fourier transform unit 11. As a result, the optical Fourier transform unit 13 generates a multi-channel optical signal $S_{THRU}$ that includes the optical signals vi, v2, and v4. The optical signals v1, v2, and v4 are multiplexed in the frequency area.

The optical Fourier transform unit 14 executes transformation processing that is the same as that of the optical Fourier transform unit 13, for the optical signal t3 that has been dropped from the TDM optical signal. That is, the optical Fourier transform unit 14 reproduces the optical signal v3.

As described above, the optical drop device 2A transforms the multi-channel optical signal in the frequency area into the TDM optical signal in the time area, and executes optical drop by the gate processing in the time area. That is, the frequency intervals of the multi-channel optical signal (or wavelength intervals of the WDM signal) are transformed into the time intervals of the TDM optical signal. Here, the gate processing in the time area may be speeded up sufficiently. Thus, in the configuration of the example, the frequency intervals of the multi-channel optical signal may be narrowed practically.

For example, in an existing technology, a WDM system in which optical signals are arranged at 50 GHz intervals has been put into practice. However, in an OADM using an existing WSS, it is difficult to further narrow the frequency intervals. In contrast, a gate time that corresponds to 10 GHz may be realized in the time area. Thus, in the configuration of the example, it is expected that an OADM that processes a WDM signal in which optical signals are arranged at 10 GHz intervals is realized.

Figure 3:
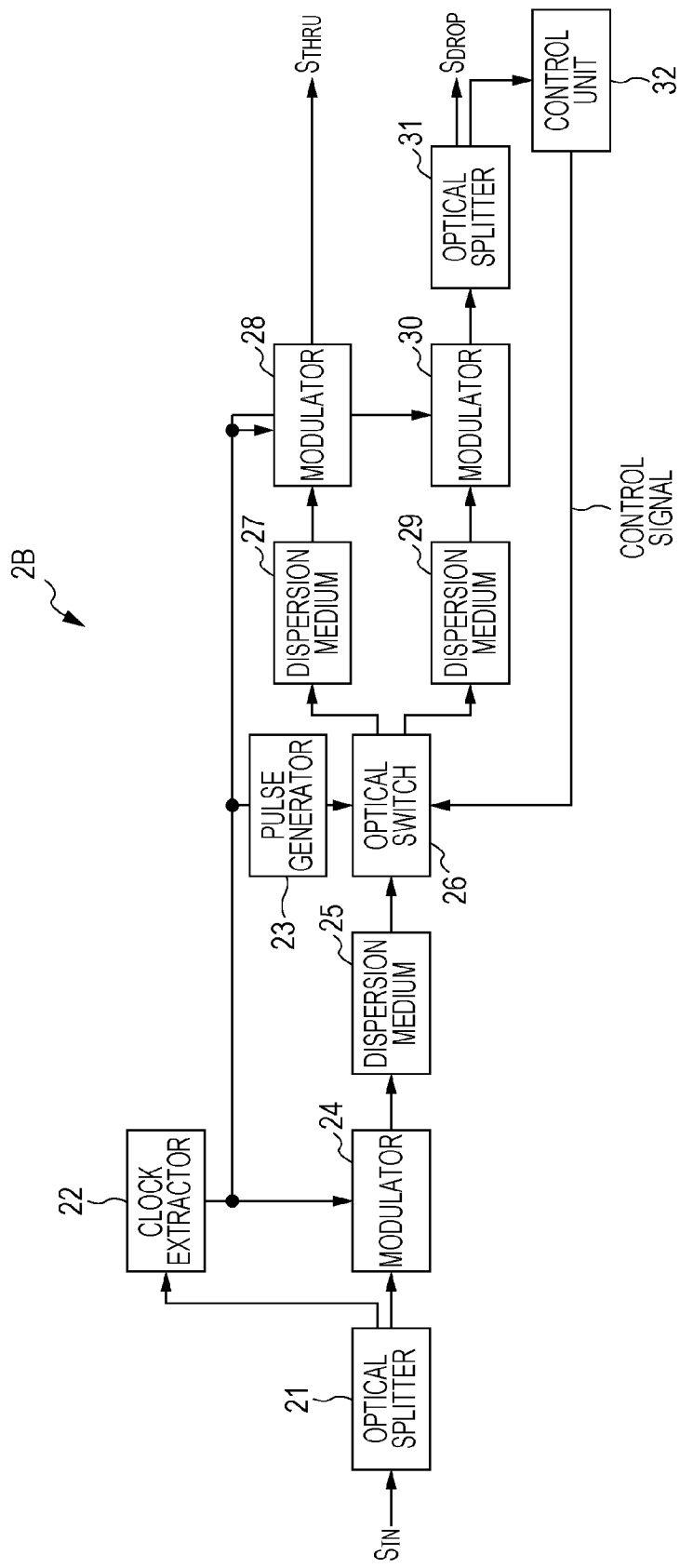
FIG. 3 is a diagram illustrating a configuration of a second example of the optical drop device.

FIG. 3 is a diagram illustrating a configuration of a second example of the optical drop device. An optical drop device 2B of the second example includes an optical splitter 21, a clock extractor 22, a pulse generator 23, a modulator 24, a dispersion medium 25, an optical switch 26, a dispersion medium 27, a modulator 28, a dispersion medium 29, a modulator 30, an optical splitter 31, and a control unit 32. A multi-channel optical signal $S_{IN}$ includes a plurality of optical signals having different optical frequencies. It is desirable that dispersion that is applied to the multi-channel optical signal $S_{IN}$ in an optical transmission path (especially in chromatic dispersion) is compensated sufficiently. For example, the OADM 1 illustrated in FIG. 1 may include a chromatic dispersion compensator on the input side of the optical drop device 2.

The optical splitter 21 branches the multi-channel optical signal $S_{IN}$ and guides the multi-channel optical signals $S_{IN}$ to the clock extractor 22 and the modulator 24. The clock extractor 22 reproduces a clock from the multi-channel optical signal $S_{IN}$ and performs output of the clock signal. The clock signal is, for example, a sine curve voltage signal the voltage change of which is represented by a sine curve in the time area. In addition, the cycle of the clock signal is, for example, the same as a time that is assigned to one symbol that is transmitted by an optical signal.

The pulse generator 23 generates a pulse signal that is synchronized with the clock signal. The width of a pulse in the pulse signal is, for example, about the same as one time slot of the TDM optical signal (time that is assigned to each of the optical signals that are multiplexed in the TDM optical signal). In addition, the pulse generator 23 generates an optical pulse signal or an electrical pulse signal. That is, when the optical switch 26 realizes the gate processing using an optical pulse, the pulse generator 23 generates an optical pulse signal from the clock signal. In addition, when the optical switch 26 realizes the gate processing using an electrical pulse, the pulse generator 23 generates an electrical pulse signal from the clock signal.

The modulator 24 performs phase modulation on the multi-channel optical signal $S_{IN}$ using the clock signal. The modulator 24 may apply phase shift that corresponds to the voltage of the clock signal, to an input optical signal. In addition, the modulator 24 may further modulate the multi-channel optical signal $S_{IN}$ on which the phase modulation has been performed, using the clock signal, as appropriate.

The dispersion medium 25 applies chromatic dispersion to the phase modulation multi-channel optical signal $S_{IN}$ that has been output from the modulator 24. As a result, a TDM optical signal is generated. The dispersion medium 25 is obtained, for example, by an optical fiber. In this case, a characteristic of the optical fiber (especially in a chromatic dispersion amount) and the length of the optical fiber are decided so that time slots of the generated TDM optical signal are arranged appropriately (alternatively, time intervals of a plurality of optical signals that are multiplexed in the generated TDM optical signal are arranged appropriately).

Figure 4:
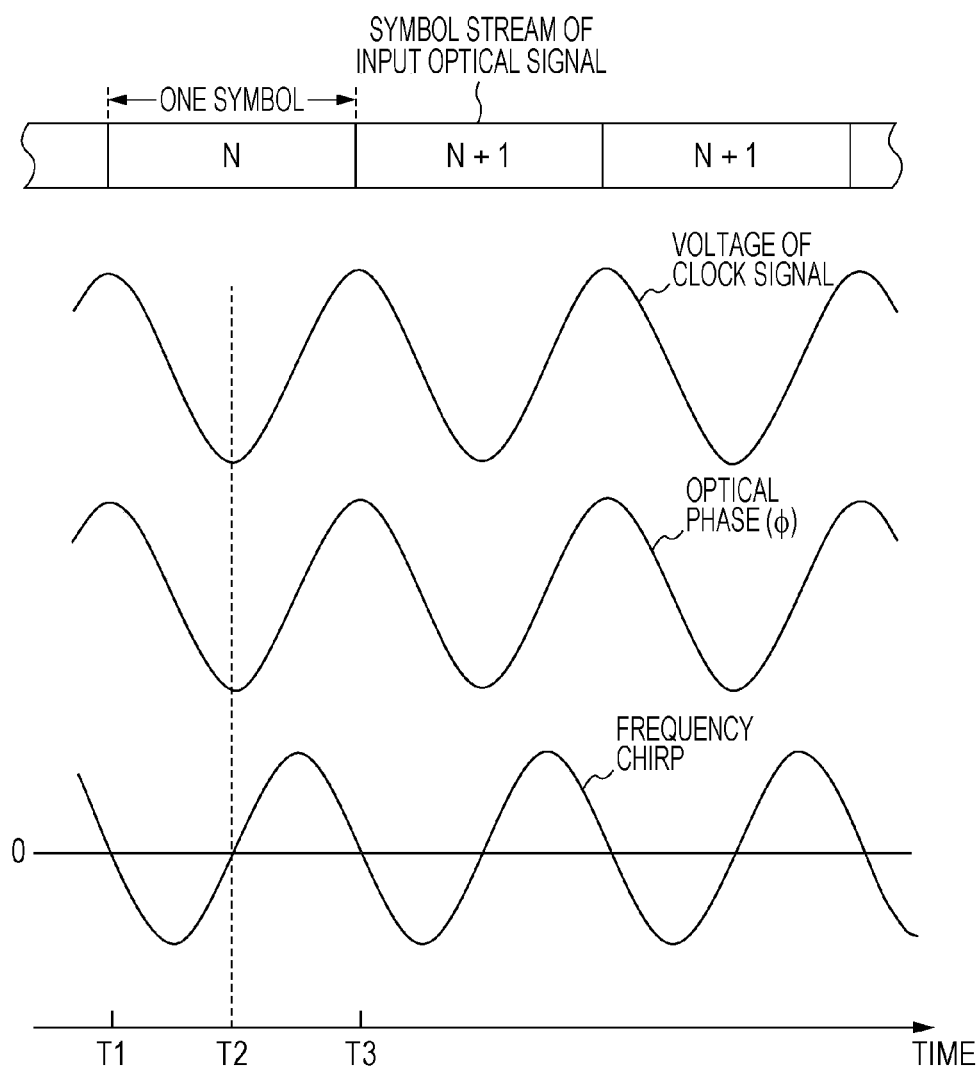
FIG. 4 is a diagram illustrating phase modulation by a modulator.

FIG. 4 is a diagram illustrating the phase modulation by the modulator. A clock signal that is applied to the modulator 24 is adjusted so that the peak or minimum value of the voltage of the clock signal is located at the center of each symbol of the input optical signal. In the example illustrated in FIG. 4, in a range of the times T1 to T3, the N-th symbol of the input optical signal exists. In addition, timing of the clock signal is adjusted so that the minimum value of the voltage of the clock signal corresponds to the time T2 (T3−T2=T2−T1). Here, the timing of the clock signal is adjusted, for example, using a variable delay element that is not illustrated. It is desirable that the clock signal is adjusted so that the peak or minimum value of the voltage is located at the center of each symbol of the input optical signal, but the clock signal may be adjusted so that the peak or minimum value of the voltage is located at the approximate center of each of the symbols.

When the above-described clock signal is applied as a drive signal of the modulator 24, the phase of lightwave by which the input optical signal is propagated is changed depending on the voltage. Here, it is assumed that a phase shift amount of the lightwave is generally proportional to the drive voltage. In this case, the phase of the optical signal that has been output from the modulator 24 is changed in synchronization with the voltage of the clock signal. In addition, the phase amplitude of the optical signal that is output from the modulator 24 is proportional to the voltage amplitude of the clock signal.

When the phase of the lightwave is changed, frequency chirp generally occurs. Here, the frequency chirp is represented by time derivative of the phase ($d\phi/dt$). In the example illustrated in FIG. 4, negative chirp occurs in the times T1 to T2, and positive chirp occurs in the times T2 to T3. In addition, as the phase amplitude becomes larger, the frequency chirp also becomes larger. That is, when the voltage amplitude of the clock signal is adjusted appropriately, desired frequency chirp can be obtained.

In this example, the modulator 24 further performs intensity modulation on the phase modulation optical signal that has been obtained as described above. In this case, the modulator 24 includes a phase modulator and a strength modulator. The strength modulator is obtained, for example, by a Mach-Zehnder interferometer. In addition, the modulator 24 applies intensity modulation to the phase modulation optical signal depending on the voltage of the clock signal. The voltage amplitude of the clock signal is adjusted, for example, so as to be $V\pi$ or less when the voltage amplitude is used for intensity modulation. Therefore, when the voltage of the clock signal is at a peak, the strength of the optical signal is also at a peak, and when the voltage of the clock signal is zero, the strength of the optical signal becomes almost zero. As a result, the phase modulation optical signal is transformed into an optical signal in which each symbol includes one pulse. That is, the intensity modulation by the clock signal is achieved.

Figure 5:
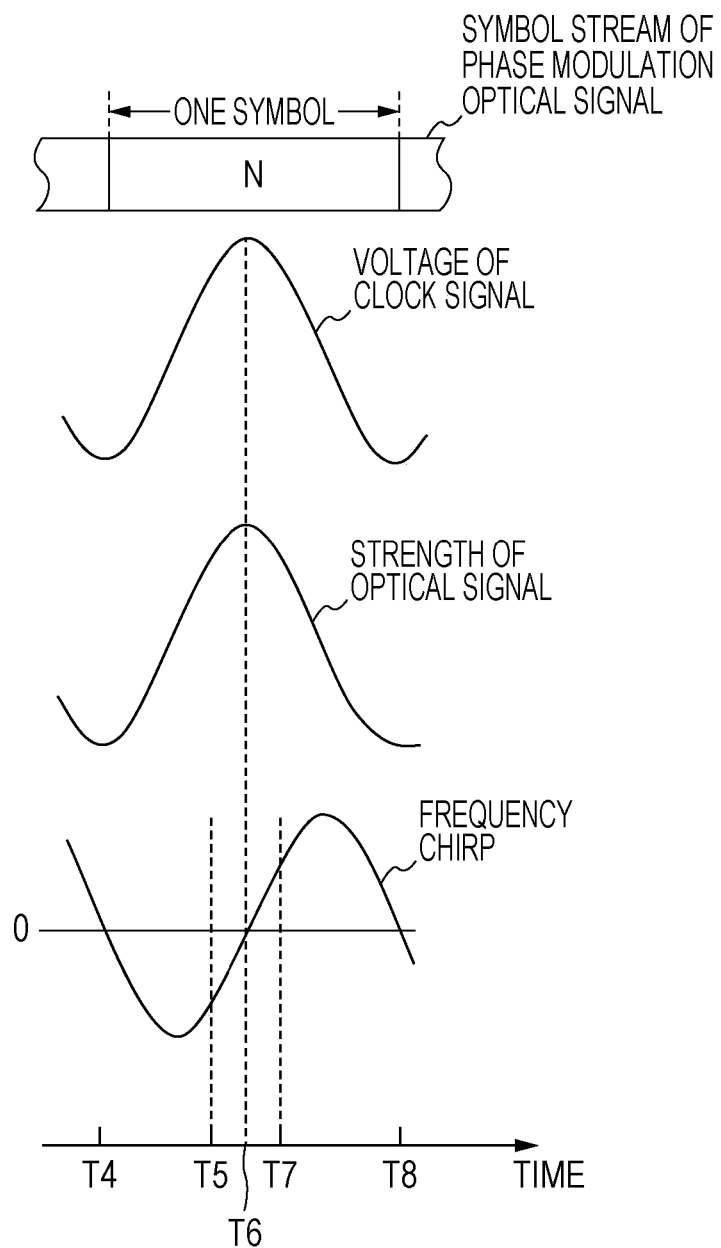
FIG. 5 is a diagram illustrating intensity modulation.

FIG. 5 is a diagram illustrating the intensity modulation. For example, the modulator 24 performs the intensity modulation so that a time area in which the frequency chirp of an optical signal is changed approximately linearly (linear chirp area) is extracted. In the example illustrated in FIG. 5, the N-th symbol of the phase modulation optical signal exists in the times T4 to T8. In addition, the frequency chirp of the phase modulation optical signal is zero at the time T6, and is increased approximately linearly in the time period of the times T5 to T7. In this case, the modulator 24 performs the intensity modulation so that the optical signal in the time area that includes the time T6 is extracted.

The above-described intensity modulation is achieved by adjusting timing of a clock signal that is applied to the strength modulator in the modulator 24. That is, the clock signal that is used for the intensity modulation is adjusted so that the peak of the voltage of the clock signal is located at the approximate center of each symbol in order to extract the linear chirp area.

When the phase modulation and the intensity modulation are performed in the modulator 24, the optical signal that has been output from the modulator 24 is modulated so that the light strength of the linear chirp area becomes large and the light strength of a further time area becomes small. As an example, the intensity modulation is performed so that the light strength becomes at a peak when the frequency chirp is zero. In addition, the optical signal that has been output from the modulator 24 is input to the dispersion medium 25.

The dispersion medium 25 is obtained, for example, by an optical fiber having a chromatic dispersion characteristic in which light the frequency chirp of which is positive moves quickly, and light the frequency chirp of which is negative moves slowly. In this case, a component at the rear part from the center of the optical pulse is propagated quickly as compared with the average speed of the optical pulse, and a component at the front part from the center of the optical pulse is propagated slowly as compared with the average speed of the optical pulse. As a result, optical pulses that have been output from the modulator 24 are concentrated on the center in the time area. That is, the pulse width of the optical signal is compressed.

Here, the multi-channel optical signal $S_{IN}$ that is input to the optical drop device 2B includes a plurality of optical signals having different optical frequencies. In addition, the speed of light that is propagated through the dispersion medium 25 depends on the wavelength (that is, optical frequency). Thus, when the multi-channel optical signal $S_{IN}$ that has been modulated by the modulator 24 is input to the dispersion medium 25, each of the plurality of optical signals that are included in the multi-channel optical signal $S_{IN}$ is propagated through the dispersion medium 25 at speed that is different depending on the optical frequency, and output from the dispersion medium 25 at a timing that is different depending on the optical frequency.

Figure 6A:
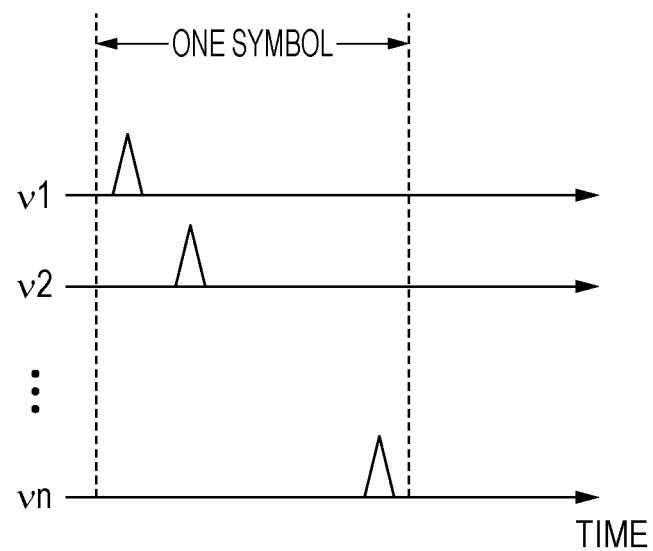
FIGS. 6A and 6B are diagrams illustrating optical signals that are output from a dispersion medium.
Figure 6B:
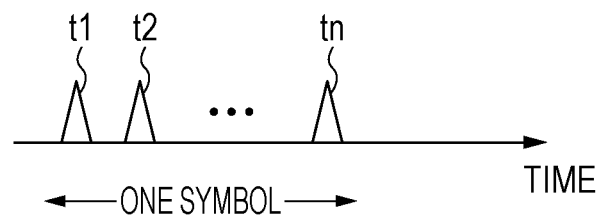

FIGS. 6A and 6B are diagrams illustrating optical signals that are output from the dispersion medium 25. In this embodiment, the multi-channel optical signal $S_{IN}$ includes a plurality of optical signals having different optical frequencies v1 to vn. In this case, as illustrated in FIG. 6A, the optical signals v1 to vn are output from the dispersion medium 25 at different timings. Here, when the optical signals v1 to vn are arranged at regular frequency intervals, the optical signals v1 to vn that are output from the dispersion medium 25 are arranged at regular intervals in the time area. At this time, each of the optical signals v1 to vn is transformed into a pulse signal by the above-described pulse compression. Hereinafter, the pulse signals that are generated from the optical signals v1 to vn may be respectively referred to as optical signals t1 to tn. In addition, a channel that is used to accommodate each of the optical signals t1 to tn may be referred to as a time slot TS.

For example, a chromatic dispersion amount of the dispersion medium 25 is decided so that the optical signals t1 to tn that are output from the dispersion medium 25 satisfy the following conditions. It is assumed that "v1" that corresponds to the optical signal t1 is the minimum frequency of the multi-channel optical signal $S_{IN}$. In addition, it is assumed that "vn" that corresponds to the optical signal tn is the maximum frequency of the multi-channel optical signal $S_{IN}$.

(1) Each of the optical signals t1 to tn is not overlapped with an optical signal of an adjacent channel in the time area.

(2) A time interval between the optical signal t1 and the optical signal tn is caused to become large as much as possible in a range within one symbol time.

FIG. 6B illustrates optical signals that are output from the dispersion medium 25. When the optical signals t1 to tn are output from the dispersion medium 25, the optical signals t1 to tn are arranged at approximately regular intervals in the time area. That is, the TDM optical signal in which the optical signals t1 to tn are multiplexed in the time area is output from the dispersion medium 25.

As described above, the modulator 24 and the dispersion medium 25 transform the multi-channel optical signal $S_{IN}$ into the TDM optical signal. That is, the modulator 24 and the dispersion medium 25 transform the frequency area multiplexing optical signal into the time area multiplexing optical signal. Thus, the modulator 24 and the dispersion medium 25 are examples of optical inverse Fourier transform units.

In the above-described example, the modulator 24 performs both of the phase modulation and the intensity modulation, but the embodiment is not limited to such a configuration. For example, the modulator 24 may not perform the intensity modulation on the input optical signal.

Figure 7:
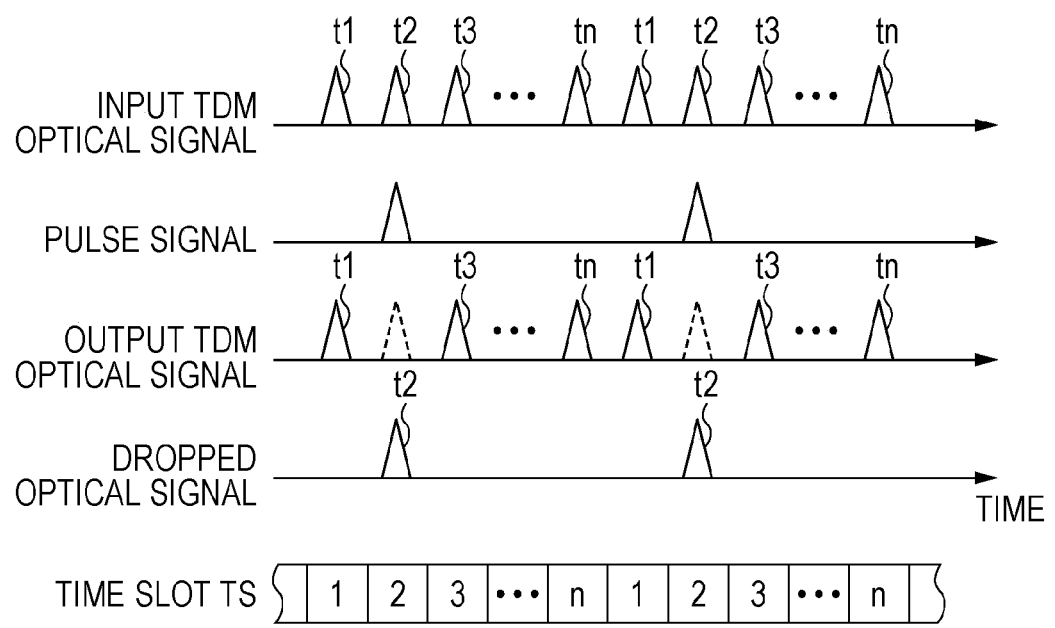
FIG. 7 is a diagram illustrating an operation of an optical switch.

The optical switch 26 drops an optical signal that exists in a time slot to which a pulse signal has been applied, from the TDM optical signal that has been output from the dispersion medium 25. For example, in the example illustrated in FIG. 7, the optical switch 26 drops the optical signal t2 from the TDM optical signal by the gate processing in the time area. In this case, the optical signal t2 that has been dropped from the TDM optical signal is guided to the dispersion medium 29. In addition, the TDM optical signal from which the optical signal t2 has been dropped is guided to the dispersion medium 27.

The dispersion medium 27 has a characteristic by which chromatic dispersion by the dispersion medium 25 is compensated. That is, when chromatic dispersion of the dispersion medium 25 is "α", chromatic dispersion of the dispersion medium 27 is "−α". In addition, the modulator 28 performs the inverse operation of the modulation operation by the modulator 24. That is, when the modulator 24 applies φ(t) to an optical signal, the modulator 28 applies −φ(t) to an optical signal.

Thus, the TDM optical signal that has been output from the optical switch 26 is transformed into a frequency area optical signal by the dispersion medium 27 and the modulator 28. That is, the dispersion medium 27 and the modulator 28 operate as optical Fourier transform units each of which performs optical Fourier transform on the TDM optical signal. The frequency area optical signal that has been obtained by the dispersion medium 27 and the modulator 28 is guided to a through port as a multi-channel optical signal $S_{THRU}$. The multi-channel optical signal $S_{THRU}$ that has been output through the through port is guided, for example, to the optical add device 3 in the OADM 1 illustrated in FIG. 1.

Similar to the dispersion medium 27, the dispersion medium 29 has a characteristic by which the chromatic dispersion by the dispersion medium 25 is compensated. In addition, similar to the modulator 28, the modulator 30 performs the inverse operation of the modulation operation by the modulator 24. That is, the dispersion medium 29 and the modulator 30 operate as optical Fourier transform units each of which performs optical Fourier transform on an optical signal that is dropped from the TDM optical signal. The drop optical signal that has been obtained by the dispersion medium 29 and the modulator 30 is output as a drop optical signal $S_{DROP}$.

The optical splitter 31 branches the drop optical signal $S_{DROP}$ that has been output from the modulator 30 and guides the drop optical signals $S_{DROP}$ to a drop port and the control unit 32. The drop optical signal $S_{DROP}$ that has been output through the drop port is guided, for example, to the client device.

The control unit 32 monitors the strength or power of the drop optical signal $S_{DROP}$. In addition, the control unit 32 generates a control signal that is used to maximize the strength or power of the drop optical signal $S_{DROP}$. The control signal is used to control timing of a pulse signal that is applied from the pulse generator 23 to the optical switch 26. The control unit 32 may monitor the frequency of the drop optical signal $S_{DROP}$. In this case, the control unit 32 may determine whether or not an optical signal having a desired frequency is dropped from the TDM optical signal appropriately.

The control unit 32 may be obtained by a processor system that includes a processor and a memory. In addition, the control unit 32 may be obtained by a hardware circuit. In addition, the control unit 32 may be obtained by a combination of software and hardware.

FIG. 8 illustrates a first example of the optical switch 26. In the first example, the optical switch 26 executes the gate processing in the time area using an optical pulse signal. Thus, the pulse generator 23 generates an optical pulse signal that is synchronized with the clock signal and applies the generated optical pulse signal to the optical switch 26.

The optical switch 26 includes a polarization controller 41, a variable delay element 42, an optical multiplexer 43, a nonlinear optical medium 44, and a polarization beam splitter (PBS) 45. A TDM optical signal that has been output from the dispersion medium 25 is guided to the polarization controller 41. In addition, the optical pulse signal that has been generated by the pulse generator 23 is guided to the variable delay element 42.

The polarization controller 41 controls an input optical signal so that the input optical signal becomes linear polarization that has been specified beforehand. The variable delay element 42 delays an input optical pulse signal in accordance with the control signal that has been generated by the control unit 32. The variable delay element 42 is obtained, for example, by an optical device the light path length of which is changed depending on the arrangement of a plurality of mirrors. In this case, the arrangement of the mirrors is controlled by the control signal. In addition, the variable delay element 42 may be obtained by an optical device the light path length of which is changed depending on the temperature of the optical device. In this case, the temperature of the optical device is controlled by the control signal.

The optical multiplexer 43 multiplexes the optical signal the polarization of which has been controlled by the polarization controller 41 and the optical pulse signal that has been delayed by the variable delay element 42, and guides the multiplexed signals to the nonlinear optical medium 44. The nonlinear optical medium 44 is obtained, for example, by a nonlinear optical fiber that provides a nonlinear optical effect (here, Kerr effect). Thus, the angle of the polarization of the input optical signal is controlled depending on the strength of control light in the nonlinear optical medium 44. In the optical switch 26, the optical pulse signal that has been generated by the pulse generator 23 is used as the control light that is used to control the polarization of the input optical signal. Thus, hereinafter, the pulse of an optical pulse signal may be referred to as a control pulse.

The PBS 45 includes a first polarization axis and a second polarization axis that are perpendicular to each other. In addition, an optical component that has been extracted by the first polarization axis is guided to a dispersion medium 27 as an output optical signal 1. On the other hand, an optical component that has been extracted by the second polarization axis is guided to a dispersion medium 29 as an output optical signal 2.

Figure 9A:
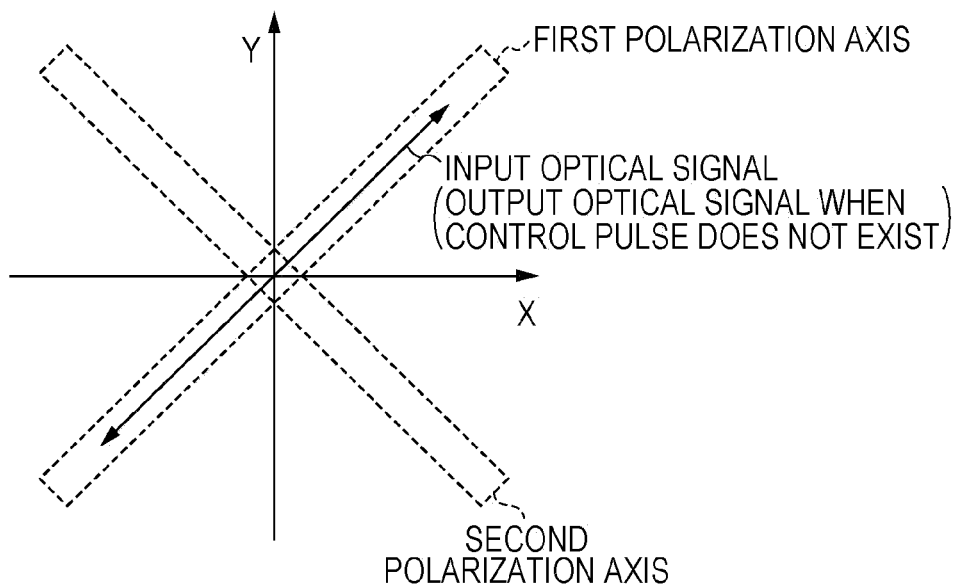
FIGS. 9A and 9B are diagrams illustrating an operation of the optical switch illustrated in FIG. 8.
Figure 9B:
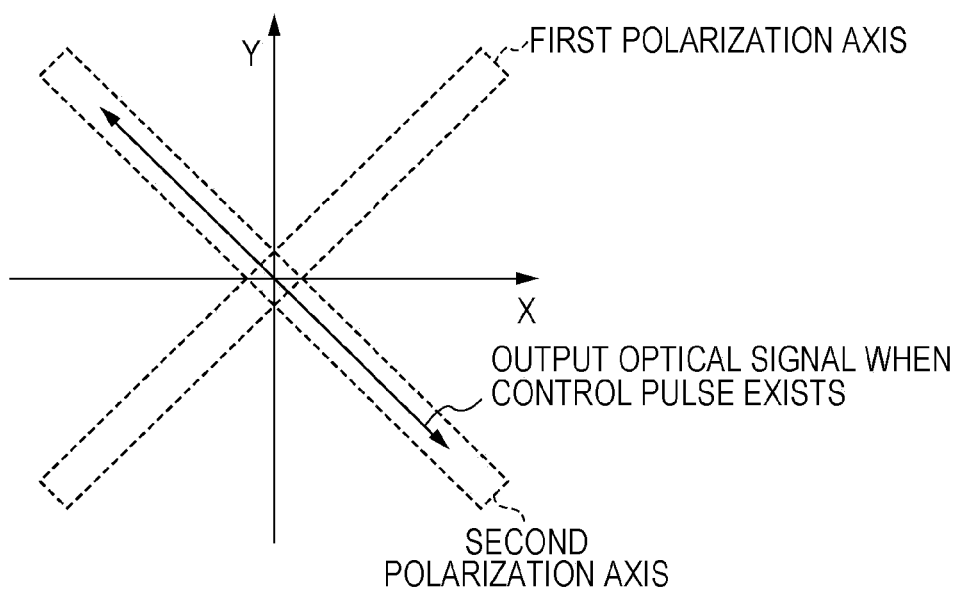

FIGS. 9A and 9B are diagrams illustrating operations of the optical switch 26 illustrated in FIG. 8. As illustrated in FIG. 8, the first polarization axis of the PBS 45 is adjusted to 45 degrees. In addition, the second polarization axis of the PBS 45 is adjusted at an angle that is perpendicular to the first polarization axis.

The polarization controller 41 controls the polarization of an input optical signal (that is, TDM optical signal) so that the polarization is approximately matched with the first polarization axis of the PBS 45. Here, when a control pulse does not exist, the polarization of the input optical signal is not changed in the nonlinear optical medium 44. Thus, when a control pulse does not exist, the polarization of an optical signal that is output from the nonlinear optical medium 44 corresponds to the state illustrated in FIG. 9A. In this case, the optical signal that has been output from the nonlinear optical medium 44 is extracted by the first polarization axis and guided to the dispersion medium 27. For example, in the example illustrated in FIG. 7, a control pulse does not exist in the time slots TS1, and TS3 to TSn. In this case, the optical signals t1, and t3 to to are not dropped from the TDM optical signal and are guided to the dispersion medium 27.

On the other hand, when a control pulse exists, the polarization of the input optical signal is changed in the nonlinear optical medium 44. In the example, when a control pulse exists, it is assumed that the strength of the control pulse is adjusted so that the polarization of the input optical signal is rotated by about 90 degrees in the nonlinear optical medium 44. Therefore, when a control pulse exists, the polarization of an optical signal that has been output from the nonlinear optical medium 44 corresponds to the state illustrated in FIG. 9B. In this case, the optical signal that has been output from the nonlinear optical medium 44 is extracted by the second polarization axis and is guided to the dispersion medium 29. For example, in the example illustrated in FIG. 7, a control pulse exists in the time slot TS2. In this case, the optical signal t2 is dropped from the TDM optical signal and guided to the dispersion medium 29.

Figure 10:
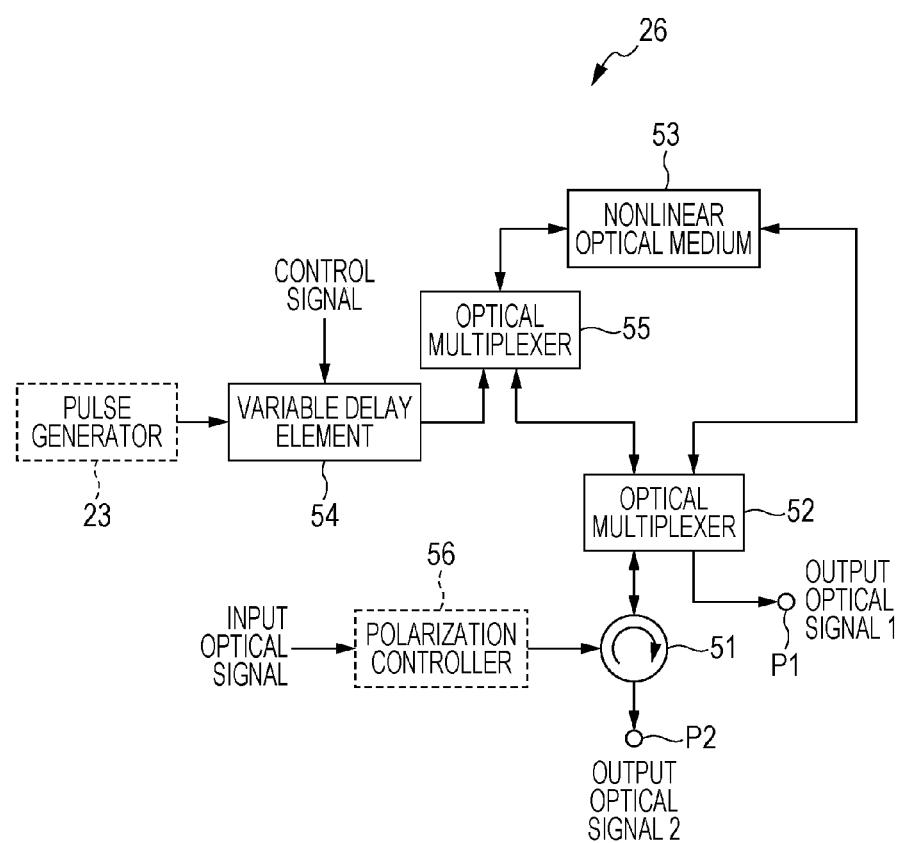
FIG. 10 is a diagram illustrating a second example of the optical switch.

FIG. 10 is a diagram illustrating a second example of the optical switch 26. In the second example, the optical switch 26 executes the gate processing in the time area using an optical pulse signal. Thus, also in the second example, the pulse generator 23 generates an optical pulse signal.

The optical switch 26 executes the gate processing in the time area using a nonlinear optical loop mirror (NOLM). Thus, the optical switch 26 of the second example includes an optical circulator 51, an optical multiplexer 52, a nonlinear optical medium 53, a variable delay element 54, and an optical multiplexer 55. The TDM optical signal that has been output from the dispersion medium 25 is guided to the optical circulator 51. In addition, the optical pulse signal that has been generated by the pulse generator 23 is guided to the variable delay element 54.

The optical circulator 51 guides the input optical signal to the optical multiplexer 52. In addition, the optical circulator 51 guides the optical signal that has been output from the optical multiplexer 52, to an output port P2. The optical multiplexer 52 branches the input optical signal that has been guided from the optical circulator 51 and propagates the input optical signals to the nonlinear optical medium 53 bidirectionally. The nonlinear optical medium 53 is formed in a loop shape. Thus, the input optical signals that has been branched by the optical multiplexer 52 are propagated to the nonlinear optical medium 53 bidirectionally (that is, in the clockwise direction and counter-clockwise direction). The nonlinear optical medium 53 is obtained, for example, by a nonlinear optical fiber that provides a nonlinear optical effect.

The variable delay element 54 causes a control pulse to be delayed in accordance with the control signal that has been generated by the control unit 32. The variable delay element 54 is substantially the same as the variable delay element 42 illustrated in FIG. 8, so that the description is omitted herein. The optical multiplexer 55 inputs the control pulse that has been delayed by the variable delay element 54, to the nonlinear optical medium 53. At this time, the control pulse is input to the nonlinear optical medium 53 so as to be propagated to the nonlinear optical medium 53 in a certain direction (for example, clockwise direction).

When a control pulse does not exist, in the optical multiplexer 52, the input optical signal that has been propagated to the nonlinear optical medium 53 in the clockwise direction and the input optical signal that has been propagated to the nonlinear optical medium 53 in the counter-clockwise direction are multiplexed with each other. In this case, the multiplexed optical signal is guided to the output port P1. The optical signal that has been output though the output port P1 (output optical signal 1) is guided to the dispersion medium 27.

On the other hand, when a control pulse exists, in the nonlinear optical medium 53, an input optical signal that is propagated in the same direction as the control pulse receives the nonlinear optical effect. Thus, in the optical multiplexer 52, an input optical signal and the input optical signal that has received the nonlinear optical effect in the nonlinear optical medium 53 are multiplexed with each other. In this case, the multiplexed optical signals are guided to the output port P2 through the optical circulator 51. The optical signal has been output though the output port P2 (output optical signal 2) is guided to the dispersion medium 29.

Thus, also by the configuration illustrated in FIG. 10, the gate processing that is similar to that by the configuration illustrated in FIG. 8 may be achieved. As illustrated in FIG. 10, the optical switch 26 may further include a polarization controller 56 that controls the polarization of the input optical signal. In this case, the polarization controller 56 controls the polarization of the input optical signal so that an extinction ratio between a case in which a control pulse exists and a case in which a control pulse does not exist is improved.

Figure 11:
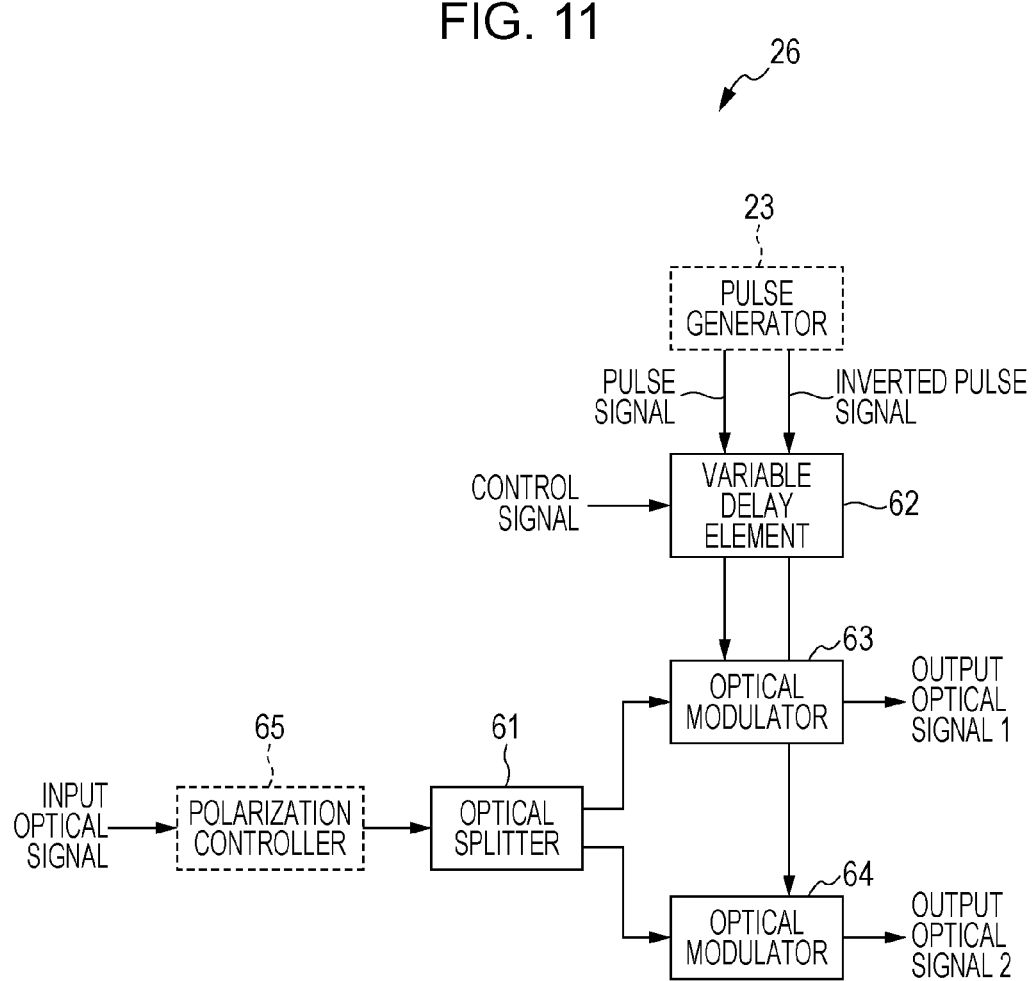
FIG. 11 is a diagram illustrating a third example of the optical switch.

FIG. 11 is a diagram illustrating a third example of the optical switch 26. In the third example, the optical switch 26 executes the gate processing in the time area using an electrical pulse signal. Thus, in the third example, the pulse generator 23 generates an electrical pulse signal. In this example, the pulse generator 23 generates a pulse signal and an inverted pulse signal. In the pulse signal and the inverted pulse signal, the logics are inverted to each other.

The optical switch 26 includes an optical splitter 61, a variable delay element 62, and optical modulators 63 and 64. The optical splitter 61 branches an input optical signal and guides the input optical signals to the optical modulators 63 and 64. The variable delay element 62 causes a pulse signal and an inverted pulse signal to be delayed in accordance with the control signal that has been generated by the control unit 32. The optical modulators 63 and 64 operate as strength modulators. That is, the optical modulator 63 controls the strength of the input optical signal in accordance with the pulse signal. Similarly, the optical modulator 64 controls the strength of the input optical signal in accordance with the inverted pulse signal. As an example, when a control pulse does not exist (when a control pulse of the inverted pulse signal exists), the optical modulator 63 causes the input optical signal to pass through the optical modulator 63, and the optical modulator 64 cuts off the input optical signal. In addition, when a control pulse exists (when a control pulse of the inverted pulse signal does not exist), the optical modulator 63 cuts off the input optical signal, and the optical modulator 64 causes the input optical signal to pass through the optical modulator 64.

Thus, also by the configuration illustrated in FIG. 11, the gate processing that is similar to that by the configuration illustrated in FIG. 8 or 10 may be executed. As illustrated in FIG. 11, the optical switch 26 may further include a polarization controller 65 that controls the polarization of the input optical signal. In this case, the polarization controller 65 controls the polarization of the input optical signal so that an extinction ratio between a case in which a control pulse exists and a case in which a control pulse does not exist is improved.

Figure 12:
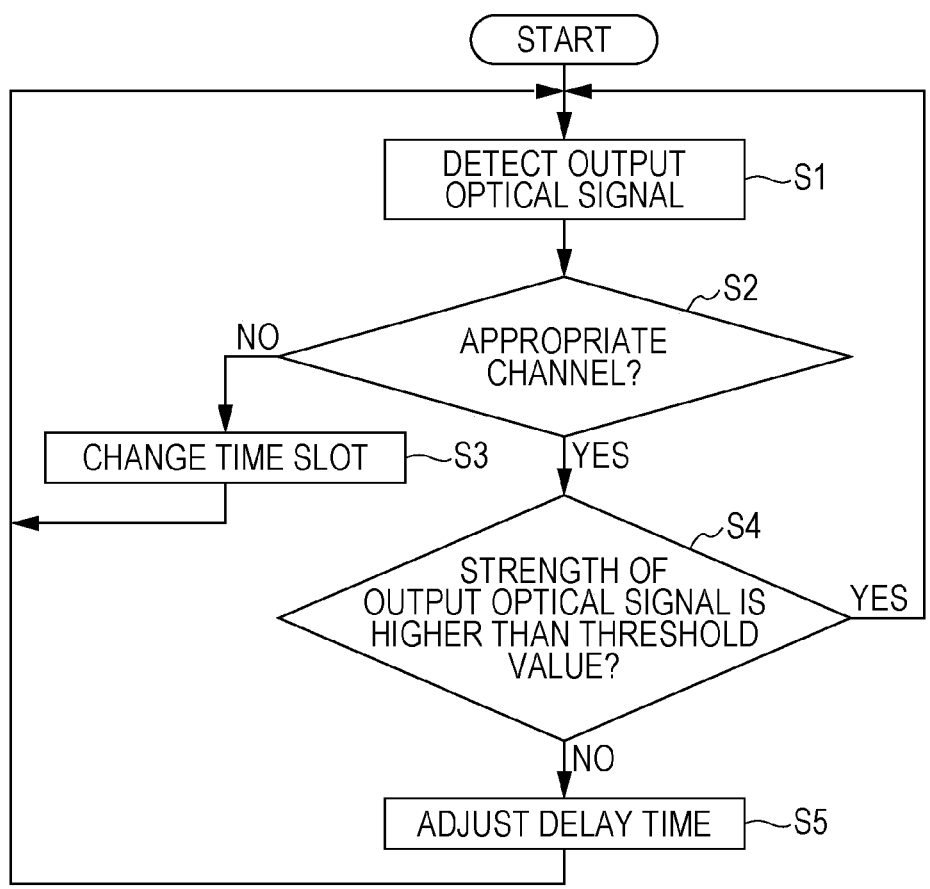
FIG. 12 is a flowchart illustrating drop processing in the optical drop device illustrated in FIG. 3.

FIG. 12 is a flowchart illustrating the drop processing in the optical drop device illustrated in FIG. 3. The processing is executed by the control unit 32. In addition, the processing is executed, for example, on a regular basis.

In S1, the control unit 32 detects an optical signal that has been output from the modulator 30 (optical signal $S_{DROP}$). At this time, the control unit 32 monitors the optical frequency and the strength of the output optical signal. In S2, the control unit 32 determines whether or not the optical frequency of the output optical signal is matched with the optical frequency of a specified drop channel.

When the control unit 32 determines that the optical frequency of the output optical signal is not matched with the optical frequency of the specified drop channel, the control unit 32 changes a time slot to which a control pulse is applied in the optical switch 26, in S3. The processing of S3 is achieved by generating a control signal that is used to control a delay time of the variable delay element (variable delay elements 42, 54, and 62 in FIGS. 8, 10, and 11, respectively). When the control unit 32 determines that the optical frequency of the output optical signal is matched with the optical frequency of the specified drop channel, the processing of S3 is skipped.

In S4, the control unit 32 compares the strength of the output optical signal with a certain threshold value. In addition, when the strength of the output optical signal is a certain threshold value or less, the control unit 32 generates a control signal that is used to control a delay time of the variable delay element. A change amount of the delay time in S4 is sufficiently small as compared with that in S3. On the other hand, when the strength of the output optical signal is more than the certain threshold value, the control unit 32 does not change and maintains the control signal.

In the example illustrated in FIG. 12, the delay time of a pulse signal is controlled so that the strength of the drop optical signal becomes higher than the threshold value, but the embodiment is not limited to such a method. That is, for example, the control unit 32 may control the delay time of the pulse signal so that the strength of the dropped optical signal is maximized.

<Optical Add Device>

Figure 13:
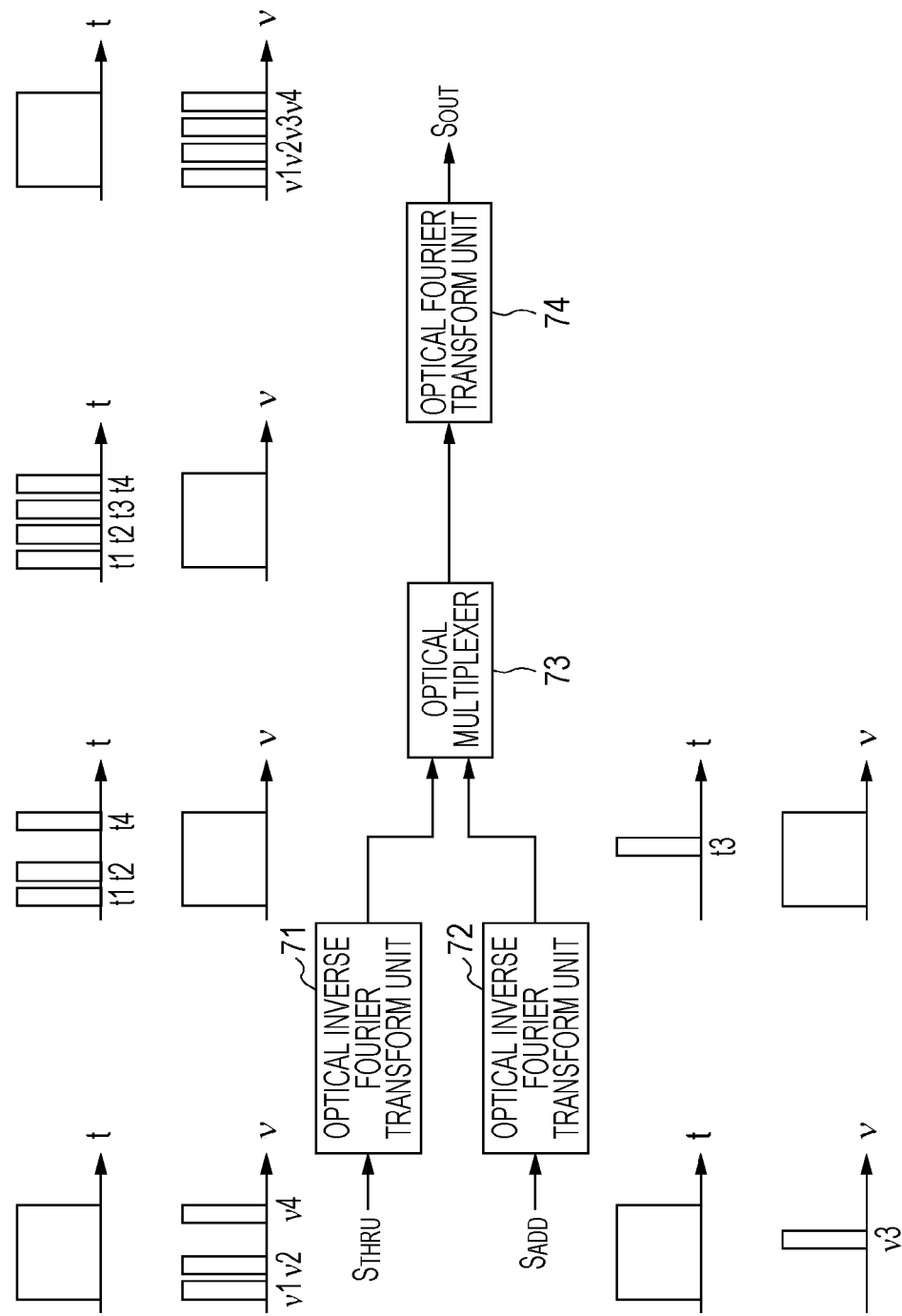
FIG. 13 is a diagram illustrating a configuration a first example of an optical add device.

FIG. 13 is a diagram illustrating a configuration of a first example of the optical add device. As illustrated in FIG. 13, an optical add device 3A of the first example includes an optical inverse Fourier transform unit 71, an optical inverse Fourier transform unit 72, an optical multiplexer 73, and an optical Fourier transform unit 74. In this example, the four channels v1 to v4 are multiplexed in a multi-channel optical signal S.

To the optical inverse Fourier transform unit 71, a multi-channel optical signal $S_{THRU}$ is input. The multi-channel optical signal $S_{THRU}$ is output, for example, from the optical drop device 2 in the OADM 1 illustrated in FIG. 1. In addition, the multi-channel optical signal $S_{THRU}$ includes the optical signals v1, v2, and v4. The optical signals v1, v2, and v4 are multiplexed in the frequency area. In addition, the optical inverse Fourier transform unit 71 transforms the multi-channel optical signal $S_{THRU}$ into a TDM optical signal.

By the TDM optical signal, transmission of the optical signals t1 to t4 is performed using the time slots TS1 to TS4. The time slots TS1 to TS4 respectively corresponds to the frequency channels v1 to v4. In addition, the optical inverse Fourier transform unit 71 generates the TDM optical signal that includes the optical signals t1, t2, and t4. The optical signals t1, t2, and t4 are multiplexed in the time area. In addition, in the time slot TS3, an optical signal is not accommodated.

To the optical inverse Fourier transform unit 72, an optical signal $S_{ADD}$ is input. The optical signal $S_{ADD}$ is transmitted, for example, from the client device. In addition, the optical frequency of the optical signal $S_{ADD}$ is "v3". In addition, the optical inverse Fourier transform unit 72 transforms the optical signal $S_{ADD}$ into a time area optical signal (optical signal t3 in FIG. 13).

The optical multiplexer 73 multiplexes the TDM optical signal that has been generated by the optical inverse Fourier transform unit 71 and the time area optical signal that has been generated by the optical inverse Fourier transform unit 72. At this time, the TDM optical signal and the optical signal t3 are multiplexed with each other so that the optical signal t3 is accommodated in the time slot TS3.

The optical Fourier transform unit 74 transforms the optical signals t1 to t4 that have been output from the optical multiplexer 73, into frequency area optical signals. That is, the optical Fourier transform unit 74 executes transformation processing that corresponds to the optical inverse Fourier transform unit 71 or 72. As a result, the optical Fourier transform unit 74 generates a multi-channel optical signal $S_{OUT}$ that includes the optical signals v1 to v4. The optical signals v1 to v4 are multiplexed with each other in the frequency area.

As described above, the optical add device 3A transforms the multi-channel optical signal in the frequency area into the TDM optical signal in the time area, and adds an optical signal to the TDM optical signal in the time area. Thus, in the optical add method by the optical add device 3A, suppression of light loss is expected as compared with the configuration in which an optical signal is added to the multi-channel optical signal in the frequency area.

Figure 14:
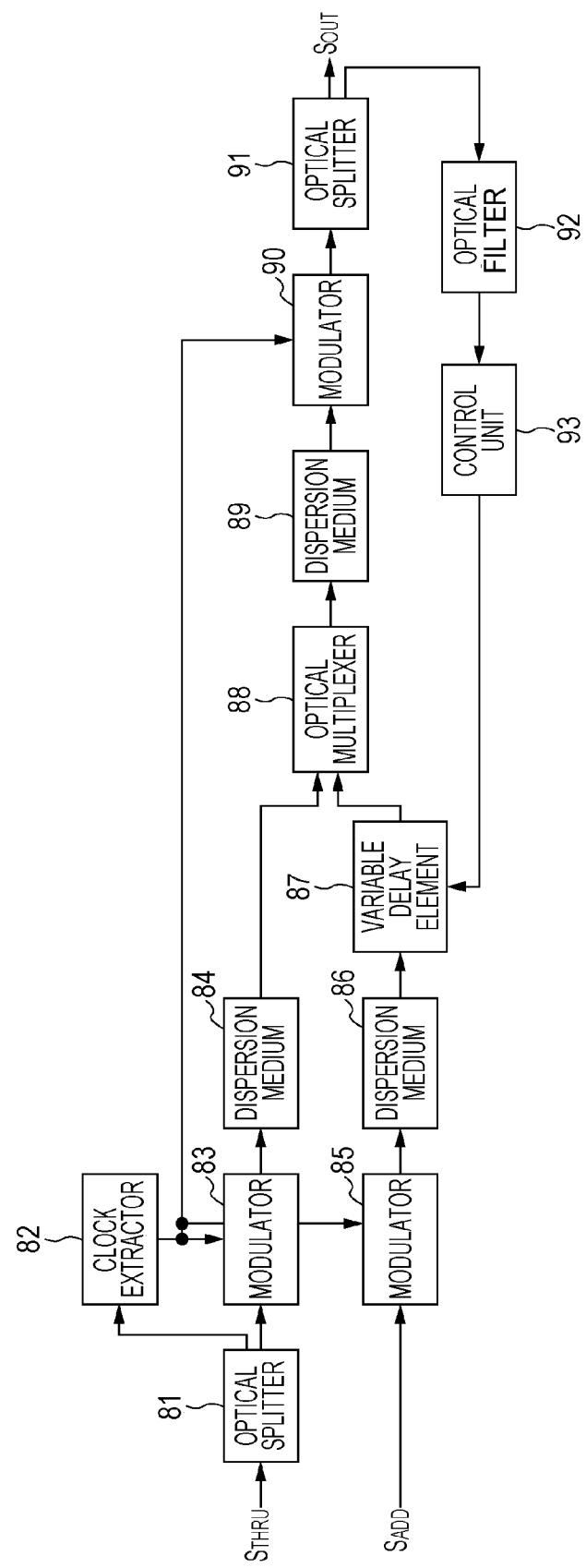
FIG. 14 is a diagram illustrating a configuration of a second example of the optical add device.

FIG. 14 illustrates a configuration of a second example of the optical add device. As illustrated in FIG. 14, an optical drop device 3B of the second example includes an optical splitter 81, a clock extractor 82, a modulator 83, a dispersion medium 84, a modulator 85, a dispersion medium 86, a variable delay element 87, an optical multiplexer 88, a dispersion medium 89, a modulator 90, an optical splitter 91, an optical filter 92, and a control unit 93. A multi-channel optical signal $S_{THRU}$ includes a plurality of optical signals having different optical frequencies. Here, it is desirable that dispersion that is applied to the multi-channel optical signal $S_{THRU}$ (for example, chromatic dispersion) is sufficiently compensated.

The configurations and operations of the optical splitter 81, the clock extractor 82, the modulator 83, and the dispersion medium 84 are substantially the same as the optical splitter 21, the clock extractor 22, the modulator 24, and the dispersion medium 25 of the optical drop device illustrated in FIG. 3. Thus, the modulator 83 and the dispersion medium 84 operate as optical inverse Fourier transform units for the multi-channel optical signal $S_{THRU}$. That is, the multi-channel optical signal $S_{THRU}$ is transformed into a TDM optical signal by the modulator 83 and the dispersion medium 84.

The configurations and operations of the optical splitter 81, the clock extractor 82, the modulator 85, and the dispersion medium 86 are also substantially the same as the optical splitter 21, the clock extractor 22, the modulator 24, and the dispersion medium 25, which are illustrated in FIG. 3. Thus, the optical signal $S_{ADD}$ is transformed into a time area optical signal by the modulator 85 and the dispersion medium 86.

The variable delay element 87 causes an optical signal that has been output from the dispersion medium 86 to be delayed, in accordance with a control signal that has been generated by the control unit 93. The configuration and operation of the variable delay element 87 is, for example, similar to the variable delay element 42 illustrated in FIG. 8. The optical multiplexer 88 multiplexes an optical signal that has been output from the dispersion medium 84 and an optical signal that has been output from the variable delay element 87. As a result, in the time area, the time area optical signal that corresponds to the optical signal $S_{ADD}$ is added to the TDM optical signal that corresponds to the multi-channel optical signal $S_{THRU}$.

The configurations and operations of the dispersion medium 89 and the modulator 90 are substantially the same as the dispersion medium 27 and the modulator 28 of the optical drop device illustrated in FIG. 3. Thus, the dispersion medium 89 and the modulator 90 transform the TDM optical signal that has been output from the optical multiplexer 88 into a frequency area optical signal. The frequency area optical signal includes the optical signal $S_{ADD}$ and the optical signals of the multi-channel optical signal $S_{THRU}$. In addition, the frequency area optical signal is transmitted to the network as a multi-channel optical signal $S_{OUT}$.

The optical splitter 91 branches the multi-channel optical signal $S_{OUT}$ and guides the multi-channel optical signal $S_{OUT}$ to the optical filter 92. The optical filter 92 extracts the frequency component of the optical signal $S_{ADD}$ from the multi-channel optical signal $S_{OUT}$. It is assumed that the frequency component of the optical signal $S_{ADD}$ is known component. In addition, the optical filter 92 is, for example, a tunable frequency filter.

The control unit 93 monitors the strength of the frequency component that has been extracted by the optical filter 92. That is, the control unit 93 monitors the strength of the optical signal $S_{ADD}$ that is included in the multi-channel optical signal $S_{OUT}$. In addition, the control unit 93 generates a control signal that is used to maximize the strength of the optical signal $S_{ADD}$. The control signal is used to control a delay amount of the variable delay element 87. The control unit 93 may be obtained by a processor system that includes a processor and a memory. In addition, the control unit 93 may be obtained by a hardware circuit. In addition, the control unit 93 may be obtained by a combination of software and hardware.

As an example, a case is described below in which the optical add device 3B adds the optical signal $S_{ADD}$ to the multi-channel optical signal $S_{THRU}$ illustrated in FIG. 13. Here, the optical signals v1, v2, and v4 that are included in the multi-channel optical signal $S_{THRU}$ are transformed into the optical signals t1, t2, and t4 that are accommodated in the time slots TS1, TS2, and TS4 by the modulator 83 and the dispersion medium 84. In addition, the multi-channel optical signal $S_{THRU}$ does not include the optical signal v3, so that the time slot TS3 of the TDM optical signal is free. In addition, the optical signal $S_{ADD}$ (that is, the optical signal v3) is transformed into the optical signal t3 by the modulator 85 and the dispersion medium 86.

In this case, the control unit 93 controls the delay amount of the variable delay element 87 so that the optical signal t3 is added to the time slot TS3 of the TDM optical signal appropriately. Here, when the optical signal t3 is added to the time slot TS3 appropriately, the v3 component that is obtained by the optical Fourier transform unit (that is, the dispersion medium 93 and the modulator 90) is large. On the other hand, when the optical signal t3 is not added to the time slot TS3 appropriately, the ν3 component that is obtained by the optical Fourier transform unit is suppressed. Thus, the control unit 93 may add an optical signal to a specified time slot appropriately by monitoring the ν3 component.

Figure 15:
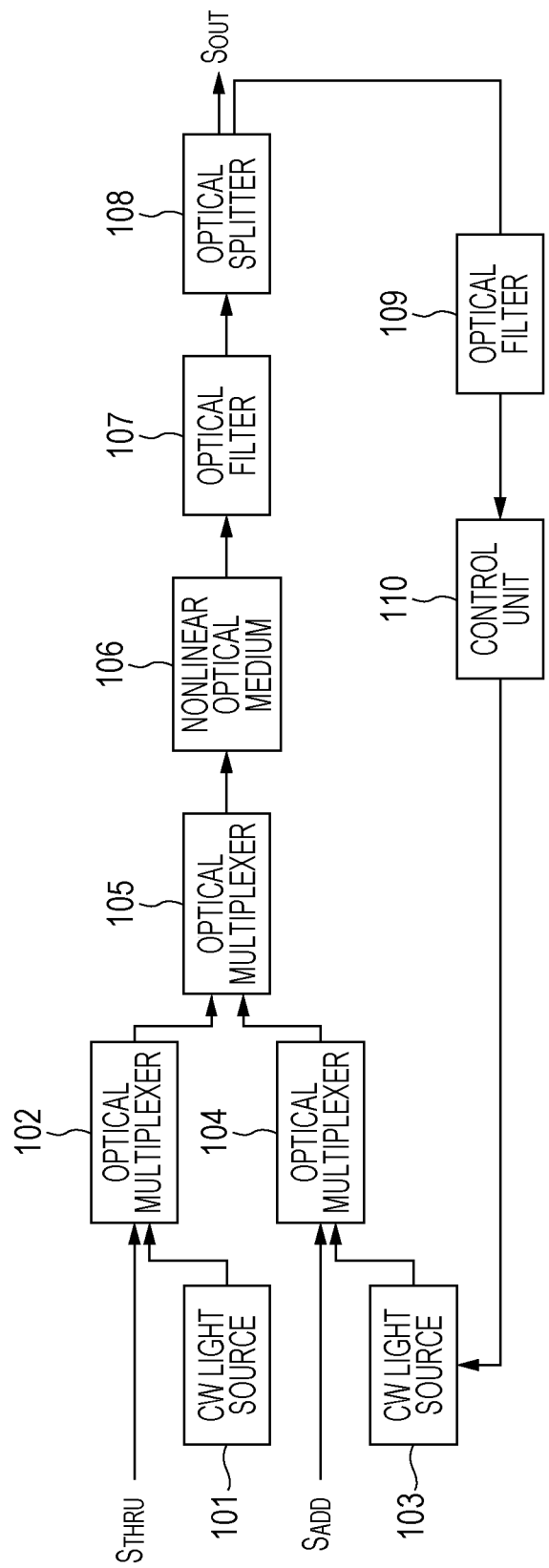
FIG. 15 is a diagram illustrating a configuration of a third example of the optical add device.

FIG. 15 illustrates a configuration of a third example of the optical add device. As illustrated in FIG. 15, an optical add device 3C of the third example includes a continuous wave (CW) light source 101, an optical multiplexer 102, a CW light source 103, an optical multiplexer 104, an optical multiplexer 105, a nonlinear optical medium 106, an optical filter 107, an optical splitter 108, an optical filter 109, and a control unit 110.

Figure 16:
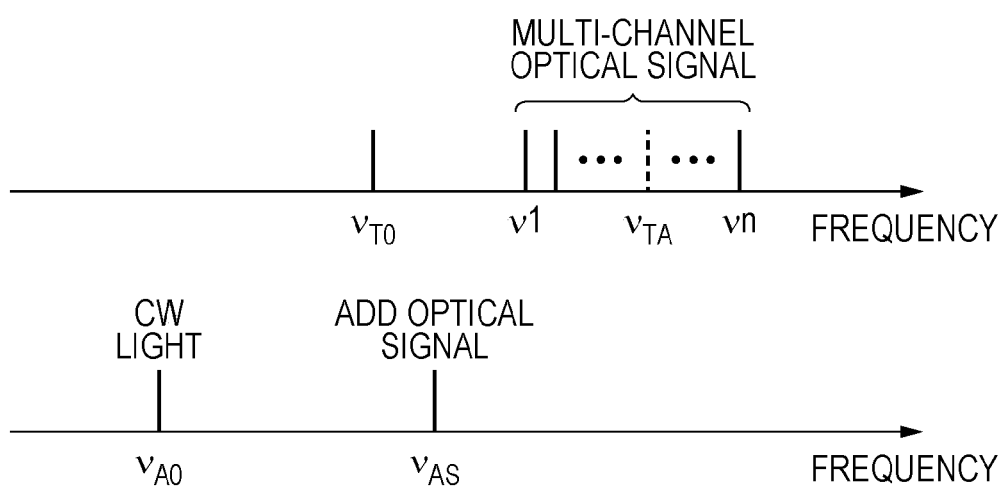
FIG. 16 is a diagram illustrating an example of wavelength allocation in the optical add device illustrated in FIG. 15.

In this example, as illustrated in FIG. 16, by a multi-channel optical signal $S_{THRU}$, transmission of optical signals may be performed using the channels ν1 to νn. However, the multi-channel optical signal $S_{THRU}$ does not include an optical signal having an optical frequency $\nu_{T4}$. In addition, the optical frequency of the optical signal $S_{ADD}$ that is to be added to the multi-channel optical signal $S_{THRU}$ is "$\nu_{as}$". In the example, the optical frequency $\nu_{as}$ is located outside the frequency band of the multi-channel optical signal $S_{THRU}$.

The CW light source 101 generates CW light of an optical frequency $\nu_{T0}$. The optical frequency $\nu_{T0}$ is located outside the frequency band of the multi-channel optical signal $S_{THRU}$. In addition, the optical multiplexer 102 multiplexes the CW light that is generated by the CW light source 101 and the multi-channel optical signal $S_{THRU}$.

The CW light source 103 generates CW light of an optical frequency $\nu_{A0}$. The optical frequency $\nu_{A0}$ is also located outside the frequency band of the multi-channel optical signal $S_{THRU}$. In addition, "$\nu_{T0}$" and "$\nu_{A0}$" are different from each other. In addition, the optical multiplexer 104 multiplexes the optical signal $S_{ADD}$ and the CW light that is generated by the CW light source 103.

The optical multiplexer 105 multiplexes the optical signal that has been output from the optical multiplexer 102 and the optical signal that has been output from the optical multiplexer 104. That is, the multi-channel optical signal $S_{THRU}$, the optical signal $S_{ADD}$, the CW light of the optical frequency $\nu_{T0}$, the CW light of the optical frequency $\nu_{A0}$ are multiplexed with each other. In addition, the output optical signal of the optical multiplexer 105 is propagated through the nonlinear optical medium 106. It is assumed that "$\nu_{T0}$" and "$\nu_{A0}$" are controlled so that the following condition (1) is satisfied.

$$|\nu_{T0}-\nu_{T4}|=|\nu_{A0}-\nu_{As}| \quad (1)$$

Therefore, in the nonlinear optical medium 106, cross-phase modulation is performed on the CW light $\nu_{T0}$ due to beat between the optical signal $S_{ADD}$ and the CW light $\nu_{A0}$, so that an optical signal that corresponds to the optical signal $S_{ADD}$ appears in the optical frequency $\nu_{T4}$. That is, the optical signal $S_{ADD}$ that includes the optical frequency $\nu_{T4}$ is obtained.

The optical filter 107 causes the frequency band (ν1 to νn) of the multi-channel optical signal to pass through the optical filter 107. Thus, the optical signal $S_{ADD}$ of the optical frequency $\nu_{as}$, the CW light $\nu_{A0}$, and the CW light $\nu_{T0}$ are reduced by the optical filter 107. In addition, the optical signal from which an unnecessary frequency component has been reduced by the optical filter 107 is output to the network as the multi-channel optical signal $S_{OUT}$.

The optical splitter 108 branches the multi-channel optical signal $S_{OUT}$ and guides the multi-channel optical signal $S_{OUT}$ to the optical filter 109. The optical filter 109 extracts the $\nu_{T4}$ component from the multi-channel optical signal $S_{OUT}$. As described above, "$\nu_{T4}$" is an optical frequency to which an optical signal has been added. In addition, the control unit 110 generates a control signal that is used to control at least one of "$\nu_{T0}$" and "$\nu_{A0}$" in order to maximize the $\nu_{T4}$ component. The control signal is applied to the CW light source 101 and/or the CW light source 103. As a result, the above-described frequency condition (1) is satisfied, and the optical signal $S_{ADD}$ is added to a free time slot of the multi-channel optical signal $S_{THRU}$ appropriately.

FIG. 17 illustrates a configuration of a fourth example of the optical add device. An optical drop device 3D of the fourth example is a modification of the third example illustrated in FIG. 15. That is, in the third example, the CW light $\nu_{T0}$ and the CW light $\nu_{A0}$ are respectively generated from the CW light sources 101 and 103. On contrast, in the fourth example, CW light $\nu_{T0}$ is generated from a multi-channel optical signal $S_{THRU}$. In addition, CW light $\nu_{A0}$ is generated from an optical signal $S_{ADD}$.

An optical splitter 111 branches the multi-channel optical signal $S_{THRU}$ and guides the multi-channel optical signals $S_{THRU}$ to an optical multiplexer 114 and an optical phase lock loop (PLL) circuit 112. The optical PLL circuit 112 generates CW light from an optical signal having a frequency $\nu_{T1}$ that is included in the multi-channel optical signal $S_{THRU}$. The frequency of the CW light is also "$\nu_{T1}$". A frequency shifter 113 shifts the frequency of the CW light that has been generated by the optical PLL circuit 112 from "$\nu_{T1}$" to "$\nu_{T0}$". The optical multiplexer 114 multiplexes the multi-channel optical signal $S_{THRU}$ and the CW light $\nu_{T0}$ that has been obtained by the frequency shifter 113.

An optical splitter 115 branches an optical signal $S_{ADD}$ and guides the add optical signals $S_{ADD}$ to an optical multiplexer 118 and an optical PLL circuit 116. The frequency of the add optical signal $S_{ADD}$ is "$\nu_{AS}$". The optical PLL circuit 116 generates CW light from the optical signal $S_{ADD}$. The frequency of the CW light is also "$\nu_{as}$". A frequency shifter 117 shifts the frequency of the CW light that has been generated by the optical PLL circuit 116 from "$\nu_{as}$" to "$\nu_{A0}$". The optical multiplexer 118 multiplexes the optical signal $S_{ADD}$ and the CW light $\nu_{A0}$ that has been obtained by the frequency shifter 117.

An optical multiplexer 119 multiplexes the optical signal that has been output from the optical multiplexer 114 and the optical signal that has been output from the optical multiplexer 118. That is, the multi-channel optical signal $S_{THRU}$, the optical signal $S_{ADD}$, the CW light $\nu_{T0}$, and the CW light $\nu_{A0}$ are multiplexed with each other. In addition, the optical signal that has been output from the optical multiplexer 119 is guided to the nonlinear optical medium 106. The configurations and operations of the nonlinear optical medium 106, the optical filter 107, the optical splitter 108, the optical filter 109, and the control unit 110 are substantially the same as those of the third example and the fourth example, and the description is omitted herein.

As described above, in the optical add devices of the third and fourth examples, the configurations that are used to generate CW light are different from each other, but an optical signal is added to a multi-channel optical signal by the substantially same optical operations. In the third example, the CW light sources 101 and 103 are examples of CW light generators. In addition, in the fourth example, the optical PLL circuits 112 and 116, and the frequency shifters 113 and 117 are examples of CW light generators.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Additional Notes.

Note 1. An optical drop device, comprising: a clock extractor configured to extract a clock signal from a multi-channel optical signal that includes a plurality of optical signals having different optical frequencies; a pulse generator configured to generate a pulse signal that is synchronized with the clock signal; an optical inverse Fourier transform unit configured to transform the multi-channel optical signal into a time division multiplexing optical signal by using an inverse Fourier transform; and an optical switch configured to drop an optical signal that exists in a time slot to which the pulse signal is applied, from the time division multiplexing optical signal.

Note 2. The optical drop device according to claim 1, wherein the optical inverse Fourier transform unit comprises: a modulator configured to perform phase modulation on the multi-channel optical signal using the clock signal, and a dispersion medium configured to generate a time division multiplexing optical signal by applying chromatic dispersion to the phase modulation multi-channel optical signal that is output from the modulator.

Note 3. The optical drop device according to claim 1 further comprising: a control unit configured to generate a control signal that is used to control timing of a pulse signal that is applied to the optical switch, based on one of strength and power of the optical signal that is dropped by the optical switch.

Note 4. The optical drop device according to claim 1 further comprising: a first optical Fourier transform unit configured to transform the time division multiplexing optical signal from which the optical signal is dropped by the optical switch, into a frequency area optical signal; and a second optical Fourier transform unit configured to transform the optical signal that is dropped from the time division multiplexing optical signal by the optical switch, into a frequency area optical signal.

Note 5. The optical drop device according to claim 1, wherein the pulse generator generates an optical pulse signal, and the optical switch comprises a nonlinear optical medium, a polarization controller configured to control polarization of the time division multiplexing optical signal that is output from the dispersion medium, an optical component configured to guide the time division multiplexing optical signal in which polarization is controlled by the polarization controller and the optical pulse signal that is generated by the pulse generator, to the nonlinear optical medium, and a light beam splitter configured to be provided on an output side of the nonlinear optical medium.

Note 6. The optical drop device according to claim 1, wherein the pulse generator generates an optical pulse signal, the optical switch comprises a nonlinear optical medium configured to be formed in a loop shape, a first optical component configured to branch the time division multiplexing optical signal that is output from the dispersion medium and causes the time division multiplexing optical signals to be propagated to the nonlinear optical medium bidirectionally, and a second optical component configured to guide the optical pulse signal to the nonlinear optical medium, and the first optical component guides the time division multiplexing optical signal to a first port when a pulse of the optical pulse signal exists in the nonlinear optical medium, and guides the time division multiplexing optical signal to a second port when a pulse of the optical pulse signal does not exist in the nonlinear optical medium.

Note 7. The optical drop device according to claim 1, wherein the pulse generator generates an electrical pulse signal, and the optical switch includes a first optical gate circuit through which the time division multiplexing optical signal passes when a pulse of the electrical pulse signal exists, and a second optical gate circuit through which the time division multiplexing optical signal passes when a pulse of the electrical pulse signal does not exist.

Note 8. An optical drop method comprising: extracting a clock signal from a multi-channel optical signal that includes a plurality of optical signals having different optical frequencies; generating a pulse signal that is synchronized with the clock signal; transforming the multi-channel optical signal into a time division multiplexing optical signal by using an inverse Fourier transform; and dropping an optical signal that exists in a time slot to which the pulse signal is applied, from the time division multiplexing optical signal.

Note 9. An optical add device, comprising: a first optical inverse Fourier transform unit that transforms a multi-channel optical signal into a time division multiplexing optical signal by using an inverse Fourier transform; a second optical inverse Fourier transform unit that transforms an optical signal into a time area optical signal by using an inverse Fourier transform; an optical multiplexer that multiplexes the time division multiplexing optical signal and the time area optical signal; and an optical Fourier transform unit that transforms an optical signal that is output from the optical multiplexer into a frequency area optical signal.

Note 10. The optical add device according to claim 9 further comprising: a variable delay element that causes a time area optical signal that is output from the second optical inverse Fourier transform unit to be delayed; and a control unit that controls a delay time of the variable delay element so that the optical signal is added to a certain time slot of the time division multiplexing optical signal, based on a frequency component of the optical signal that is included in the frequency area optical signal that is output from the optical Fourier transform unit.

Note 11. An optical add device, comprising: a nonlinear optical medium; a first continuous wave light generator that generates first continuous wave light having a first optical frequency; a second continuous wave light generator that generates second continuous wave light having a second optical frequency; an optical multiplexer that multiplexes the first continuous wave light, the second continuous wave light, a multi-channel optical signal in which a third optical frequency is a free channel, and an optical signal having a fourth optical frequency, and guides the multiplexed light and signals to the nonlinear optical medium; an optical filter that is provided on an output side of the nonlinear optical medium and through which the multi-channel optical signal passes; a control unit that controls one of the first continuous wave light generator and the second continuous wave light generator so that a difference between the first optical frequency and the third optical frequency is approximately identical to a difference between the second optical frequency and the fourth optical frequency, based on one of strength and power of the third optical frequency component in the optical signal that is output from the optical filter.

Note 12. The optical add device according to claim 11, wherein the first continuous wave light generator generates the first continuous wave light from the multi-channel optical signal, and the second continuous wave light generator generates the second continuous wave light from the optical signal.

Note 13. An optical add drop multiplexer that processes a multi-channel optical signal that includes a plurality of optical signals having different optical frequencies, the optical add drop multiplexer comprising: an optical drop device; and an optical add device, wherein the optical drop device includes: a clock extractor that extracts a clock signal from the multi-channel optical signal that includes the plurality of optical signals having different optical frequencies, a pulse generator that generates a pulse signal that is synchronized with the clock signal, a first optical inverse Fourier transform unit that transforms the multi-channel optical signal into a time division multiplexing optical signal by using an inverse Fourier transform, an optical switch that drops an optical signal that exists in a time slot to which the pulse signal is applied, from the time division multiplexing optical signal that is output from the first optical inverse Fourier transform unit, a first optical Fourier transform unit that transforms the time division multiplexing optical signal from which the optical signal is dropped by the optical switch, into a frequency area optical signal, and a second optical Fourier transform unit that transforms the optical signal that is dropped from the time division multiplexing optical signal by the optical switch, into a second frequency area optical signal, and the optical add device includes: a second optical inverse Fourier transform unit that transforms the first frequency area optical signal that is output from the optical drop device, into a time division multiplexing optical signal by using an inverse Fourier transform, a third optical inverse Fourier transform unit that transforms an optical signal into a time area optical signal by using an inverse Fourier transform, an optical multiplexer that multiplexes the time division multiplexing optical signal that is output from the second optical inverse Fourier transform unit and the time area optical signal that is output from the third optical inverse Fourier transform unit, and a third optical Fourier transform unit that transforms the optical signal that is output from the optical multiplexer into a frequency area optical signal.

What is claimed is:

1. An optical drop device, comprising:
  a clock extractor configured to extract a clock signal from a multi-channel optical signal that includes a plurality of optical signals having different optical frequencies;
  a pulse generator configured to generate a pulse signal that is synchronized with the clock signal;
  a modulator configured to perform phase modulation on the multi-channel optical signal using the clock signal, and
  a dispersion medium configured to generate a time division multiplexing optical signal by applying chromatic dispersion to the phase modulation multi-channel optical signal that is output from the modulator;
  an optical switch configured to drop an optical signal that exists in a time slot to which the pulse signal is applied, from the time division multiplexing optical signal;
  a control unit configured to generate a control signal that is used to control timing of a pulse signal that is applied to the optical switch, based on strength of the optical signal that is dropped by the optical switch;
  a first optical Fourier transform unit configured to transform the time division multiplexing optical signal from which the optical signal is dropped by the optical switch, into a frequency area optical signal; and
  a second optical Fourier transform unit configured to transform the optical signal that is dropped from the time division multiplexing optical signal by the optical switch, into a frequency area optical signal.

2. The optical drop device according to claim 1, wherein the pulse generator generates an optical pulse signal, and the optical switch comprises a nonlinear optical medium, a polarization controller configured to control polarization of the time division multiplexing optical signal that is output from the dispersion medium, an optical component configured to guide the time division multiplexing optical signal in which polarization is controlled by the polarization controller and the optical pulse signal that is generated by the pulse generator, to the nonlinear optical medium, and a light beam splitter configured to be provided on an output side of the nonlinear optical medium.

3. The optical drop device according to claim 1, wherein the pulse generator generates an optical pulse signal,
  the optical switch comprises a nonlinear optical medium formed in a loop shape, a first optical component configured to branch the time division multiplexing optical signal that is output from the dispersion medium and causes the time division multiplexing optical signals to be propagated to the nonlinear optical medium bidirectionally, and a second optical component configured to guide the optical pulse signal to the nonlinear optical medium, and
  the first optical component guides the time division multiplexing optical signal to a first port when a pulse of the optical pulse signal exists in the nonlinear optical medium, and guides the time division multiplexing optical signal to a second port when a pulse of the optical pulse signal does not exist in the nonlinear optical medium.

4. The optical drop device according to claim 1, wherein the pulse generator generates an electrical pulse signal, and
  the optical switch includes a first optical gate circuit through which the time division multiplexing optical signal passes when a pulse of the electrical pulse signal exists, and a second optical gate circuit through which the time division multiplexing optical signal passes when a pulse of the electrical pulse signal does not exist.

5. An optical drop method comprising:
  extracting a clock signal from a multi-channel optical signal that includes a plurality of optical signals having different optical frequencies;
  generating a pulse signal that is synchronized with the clock signal;
  transforming the multi-channel optical signal into a time division multiplexing optical signal by using an inverse Fourier transform;
  dropping an optical signal that exists in a time slot to which the pulse signal is applied, from the time division multiplexing optical signal;
  generating a control signal that is used to control timing of a pulse signal that is applied to the optical switch, based on strength of the optical signal that is dropped by the optical switch;
  transforming the time division multiplexing optical signal from which the optical signal is dropped by the optical switch, into a frequency area optical signal; and transforming the optical signal that is dropped from the time division multiplexing optical signal by the optical switch, into a frequency area optical signal.

6. An optical add device, comprising:
a first optical inverse Fourier transform unit that transforms a multi-channel optical signal into a time division multiplexing optical signal by using an inverse Fourier transform;
a second optical inverse Fourier transform unit that transforms an optical signal into a time area optical signal by using an inverse Fourier transform;
an optical multiplexer that multiplexes the time division multiplexing optical signal and the time area optical signal; and
an optical Fourier transform unit that transforms an optical signal that is output from the optical multiplexer into a frequency area optical signal;
a variable delay element that causes a time area optical signal that is output from the second optical inverse Fourier transform unit to be delayed;
a control unit that controls a delay time of the variable delay element so that the optical signal is added to a certain time slot of the time division multiplexing optical signal, based on a frequency component of the optical signal that is included in the frequency area optical signal that is output from the optical Fourier transform unit.

* * * * *